US010168800B2

(12) United States Patent
Kim et al.

(10) Patent No.: US 10,168,800 B2
(45) Date of Patent: Jan. 1, 2019

(54) SYNCHRONIZATION OF TEXT DATA AMONG A PLURALITY OF DEVICES

(71) Applicant: Samsung Electronics Co., Ltd., Suwon-si, Gyeonggi-do (KR)

(72) Inventors: Seok Won Kim, Suwon-si (KR); Wan Seok Kim, Suwon-si (KR); Jae Seok Shim, Seongnam-si (KR); Jun Hee Kim, Gwangmyeong-si (KR); Jae Ung Hwang, Goyang-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 80 days.

(21) Appl. No.: 15/056,188

(22) Filed: Feb. 29, 2016

(65) Prior Publication Data

US 2016/0252972 A1  Sep. 1, 2016

(30) Foreign Application Priority Data

Feb. 28, 2015 (KR) .................. 10-2015-0028686

(51) Int. Cl.
*G10L 15/183* (2013.01)
*G10L 15/30* (2013.01)
*G06F 3/023* (2006.01)
*G10L 15/26* (2006.01)
*G06F 17/27* (2006.01)

(52) U.S. Cl.
CPC .......... *G06F 3/0237* (2013.01); *G10L 15/183* (2013.01); *G10L 15/265* (2013.01); *G06F 17/276* (2013.01); *G10L 15/30* (2013.01)

(58) Field of Classification Search
CPC ................ G06F 3/0237; G10L 15/30
See application file for complete search history.

(56) References Cited

U.S. PATENT DOCUMENTS

| | | | | |
|---|---|---|---|---|
| 6,195,641 | B1* | 2/2001 | Loring | G10L 15/30 704/270 |
| 6,408,272 | B1* | 6/2002 | White | G10L 15/30 704/270.1 |
| 6,430,551 | B1* | 8/2002 | Thelen | G09B 19/06 |
| 7,035,788 | B1* | 4/2006 | Nakajima | G06F 17/2715 704/1 |
| 7,099,824 | B2* | 8/2006 | Kushida | G10L 15/30 704/231 |
| 7,228,270 | B2* | 6/2007 | Aso | G10L 13/08 704/10 |
| 8,819,574 | B2 | 8/2014 | Ouyang et al. | |
| 8,832,589 | B2 | 9/2014 | Zhai et al. | |

(Continued)

FOREIGN PATENT DOCUMENTS

KR   10-2015-0013294 A   2/2015

*Primary Examiner* — Jialong He
(74) *Attorney, Agent, or Firm* — Jefferson IP Law, LLP

(57) ABSTRACT

An electronic device is provided. The electronic device includes a memory configured to store language model data, a communication module configured to communicate with a server, an input interface configured to obtain a sentence input, and a processor configured to update the language model data based on the sentence input and cause the communication module to transmit the language model data to the server in order to synchronize the language model data with another electronic device associated with a user account of the electronic device.

2 Claims, 17 Drawing Sheets

(56) References Cited

U.S. PATENT DOCUMENTS

| | | | |
|---|---|---|---|
| 8,983,849 B2* | 3/2015 | Phillips | G06F 17/275 704/276 |
| 9,199,155 B2 | 12/2015 | Skory et al. | |
| 2003/0182113 A1* | 9/2003 | Huang | G10L 15/30 704/231 |
| 2005/0102142 A1* | 5/2005 | Soufflet | G10L 15/18 704/246 |
| 2005/0283724 A1* | 12/2005 | Griffin | G06F 17/2735 715/259 |
| 2007/0233487 A1* | 10/2007 | Cohen | G10L 15/065 704/255 |
| 2010/0063819 A1* | 3/2010 | Emori | G10L 15/197 704/251 |
| 2010/0324899 A1* | 12/2010 | Yamabana | G10L 15/07 704/251 |
| 2011/0208805 A1* | 8/2011 | Kasetty | G06F 17/2211 709/203 |
| 2012/0059810 A1* | 3/2012 | Sejnoha | G06F 17/30976 707/706 |
| 2012/0166388 A1* | 6/2012 | Glatt | H04L 67/1095 707/610 |
| 2014/0108003 A1* | 4/2014 | Phillips | G06F 17/275 704/8 |
| 2014/0108018 A1* | 4/2014 | Phillips | G06F 17/275 704/275 |
| 2014/0115519 A1 | 4/2014 | Ouyang et al. | |
| 2014/0181228 A1* | 6/2014 | Cho | H04L 67/1095 709/206 |
| 2014/0201671 A1 | 7/2014 | Zhai et al. | |
| 2014/0278349 A1 | 9/2014 | Grieves et al. | |
| 2014/0278368 A1 | 9/2014 | Skory | |
| 2014/0297267 A1 | 10/2014 | Spencer et al. | |
| 2014/0316784 A1 | 10/2014 | Bradford et al. | |
| 2014/0350931 A1 | 11/2014 | Levit et al. | |
| 2014/0351741 A1 | 11/2014 | Medlock et al. | |
| 2014/0351760 A1 | 11/2014 | Skory et al. | |
| 2014/0372880 A1 | 12/2014 | Zhai et al. | |
| 2015/0006148 A1 | 1/2015 | Goldszmit et al. | |
| 2015/0026628 A1 | 1/2015 | Ouyang et al. | |
| 2015/0134326 A1 | 5/2015 | Bell et al. | |
| 2015/0379989 A1* | 12/2015 | Balasubramanian | G06Q 30/0255 704/233 |
| 2016/0252972 A1* | 9/2016 | Kim | G10L 15/183 704/9 |
| 2017/0018268 A1* | 1/2017 | Quast | G10L 15/063 |
| 2017/0032779 A1* | 2/2017 | Ahn | G06F 17/2705 |

\* cited by examiner

SYNCHRONIZATION OF TEXT DATA AMONG A PLURALITY OF DEVICES

CROSS-REFERENCE TO RELATED APPLICATION(S)

This application claims the benefit under 35 U.S.C. § 119(a) of a Korean patent application filed on Feb. 28, 2015 in the Korean Intellectual Property Office and assigned Serial number 10-2015-0028686, the entire disclosure of which is hereby incorporated by reference.

TECHNICAL FIELD

The present disclosure relates to a technology for synchronizing text data among a plurality of electronic devices that provide a function of predicting an input word.

BACKGROUND

Electronic devices such as smartphones or tablets may include a physical input device (e.g., a hardware keyboard) or a software input device (e.g., a soft input panel (SIP) or a virtual keyboard). A user may input multiple words to exchange messages with another party or write an electronic mail using such an input device.

Recent electronic devices having a word prediction function or a prediction engine may provide word or text prediction through an input habit of a user and the prediction function. For example, when a user inputs a specific word through a messenger application or even when the user does not input any word, such an electronic device may output, to a display, recommended words that are expected to be input by the user, and may input, to an input field, a word selected by the user. Accordingly, the electronic device may enable the user to complete a sentence more easily without typing every single character of a word.

As a user more frequently changes an electronic device (e.g., a smartphone) and uses multiple electronic devices (e.g., a smartphone, a smart watch, a tablet, a personal computer (PC), a television (TV), etc.) in association with one user account, an electronic device used as an input device by the user may be frequently changed. For example, the user may replace a currently used smartphone with a new model, or the user may use a tablet to write an electronic mail while the user usually uses a smartphone at other times.

In the case where an electronic device used by a user is replaced, a history of inputs or a trained language model accumulated in a previous device may not be supported by a substituted device or a part of the history of inputs may be lost. Furthermore, in the case where electronic devices of the user use different language models, the language models may not be compatible with each other.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide various methods for efficiently synchronizing language models among a plurality of terminals and preserving an input history.

In accordance with an aspect of the present disclosure, an electronic device is provided. The electronic device includes a memory configured to store language model data, a communication module configured to communicate with a server, an input interface configured to obtain a sentence input, and a processor configured to update the language model data based on the sentence input and cause the communication module to transmit the language model data to the server in order to synchronize the language model data with another electronic device associated with a user account of the electronic device.

In accordance with another aspect of the present disclosure, an electronic device is provided. The electronic device includes a communication module, an input interface, a processor electrically connected to the communication module and the input interface, and a memory electrically connected to the processor and including text data. The memory stores instructions that, when executed, cause the processor to receive a touch or voice input through the input interface, generate a text based on the input, apply at least one word to the text data based on the generated text, receive first version information related to the text data via the communication module, and compare the first version information with second version information stored in the memory before reception of the first version information.

In accordance with another aspect of the present disclosure, a language model synchronization server is provided. The language model synchronization server includes a communication unit configured to receive language model data from a first electronic device associated with a user account, a storage configured to store language model data corresponding to the user account, an account information processing unit configured to identify a second electronic device associated with the user account, and a synchronization control unit configured to substitute the received language model data for the language model data stored in the storage and transmit a synchronization notification message to the second electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although a language model is used as an object to be synchronized in various embodiments of the present disclosure, the object to be synchronized may be construed as data for sharing experiences of text inputs and recommendations between user terminals as in one aspect of the present disclosure. For example, the language model described herein may be construed as various concepts such as text data, a text database, a data structure, etc.

Hereinafter, an electronic device according to various embodiments of the present disclosure will be described with reference to the accompanying drawings.

Figure 1:
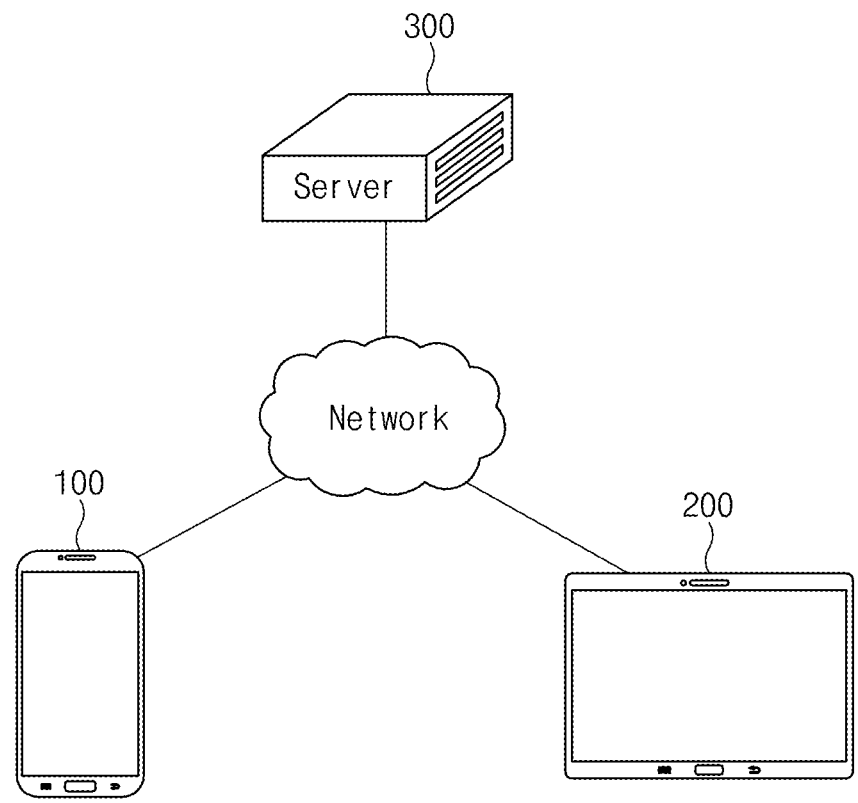
FIG. 1 illustrates a network environment for synchronization of a language model according to an embodiment of the present disclosure.

FIG. 1 illustrates a network environment for synchronization of a language model according to an embodiment of the present disclosure.

Referring to FIG. 1, a first electronic device 100 (e.g., a smartphone) may be connected to a server 300 via a network. The first electronic device 100 may be associated with a specific user by user identification information. For example, user_a@account.com that is an account of a user A may be registered in the server 300 while the first electronic device 100 is initialized or set.

The first electronic device 100 may provide a function of predicting an input word using a language model. For example, if a user inputs the wording "I read a" to the first electronic device 100, the first electronic device 100 may recommend several words of which probabilities of following the wording "I read a" are relatively high, based on data pre-stored in the language model or a history of user's inputs accumulated therein. For example, the first electronic device 100 may output, to a display thereof, three words, i.e., "book", "paper", and "news" in response to the input of "I read a" from the user. The user may select any one of the three words, or may directly input a word using an input interface such as a soft input panel (SIP). Furthermore, the user may select one word (e.g., news) from among the recommended words in another manner (e.g., a long touch) to remove it from a recommended list. In this case, the first electronic device 100 may additionally output a word having a fourth highest probability as a recommended word, or may maintain the output of the two words.

If inputting a sentence is completed, the first electronic device 100 may update the language model based on a sentence input. For example, the (recommendation) probability of a word input or selected by the user may be increased, and the probability of a word not input or selected by the user may be decreased. Language models may be operated by different algorithms according to the types of the language models. For example, a relationship between a word and another word, a total number of times of use of a word, data previously stored in a language model, and an arbitrary weight may be used in combination in order to update the language model. It should also be noted that, while the input is labelled a "sentence input," it is not necessary that the input comprises a complete sentence. For example, the input may be a phrase or a series of words that a user may input for a communication.

A probability of combination of a word/sentence in a language model is described below. For example, three sentences such as <BOS> JOHN READ MOBY DICK <EOS>, <BOS> MARY READ A DIFFERENT BOOK <EOS>, <BOS> SHE READ A BOOK BY CHER <EOS> may be obtained by the user. Here, <BOS> may represent beginning of sentence, and <EOS> may represent end of sentence.

A probability of combination of "John read a book" may be obtained from the above-mentioned three sentences as described below. The probability of this sentence may be obtained by calculating a probability that a sentence will start with JOHN, a probability that JOHN will be followed by READ, a probability that READ will be followed by A, a probability that A will be followed by BOOK, and a probability that the sentence will be ended with BOOK and multiplying the calculated probabilities. For example, the probability P(JOHN|<BOS>) that the sentence will start with JOHN corresponds to ⅓, since only one of the three sentences starts with JOHN. The probability P(READ-|JOHN) that JOHN will be followed by READ corresponds to 1, since there is only one word, i.e., READ, which follows JOHN. In this manner, the probabilities P(A|READ) (=⅔), P(BOOK|A) (=½), and P(<EOS>|BOOK) (=½) are calculated, and, by multiplying all the calculated probabilities, the probability P(JOHN READ A BOOK) may be obtained as approximately 0.06.

The first electronic device 100 may transmit an updated language model (more specifically, a database or data constituting a language model) to the server 300 via the network. The server 300 may obtain user account information (e.g., user_a@account.com) of the first electronic device 100, and may search for a second electronic device 200 (e.g., a tablet) which uses user account information (e.g., family, lover, etc.) that is identical or related to the obtained user account information. The server 300 may provide, to the second electronic device 200, data for synchronizing a language model.

Although FIG. 1 illustrates that the first electronic device 100 is a smartphone and the second electronic device 200 is a tablet, this illustration is merely an example for description and is not intended to limit the first and second electronic devices 100 and 200. The first and second electronic devices 100 and 200 may be arbitrary electronic devices, and may be the same type of electronic device (e.g., a note PC and another note PC).

An exemplary configuration of the first electronic device 100 is described below with reference to FIGS. 2 and 3. The descriptions provided with reference to FIGS. 2 and 3 may also be construed as descriptions of the second electronic device 200. Furthermore, an exemplary configuration of the server 300 is described below with reference to FIG. 4.

Figure 2:
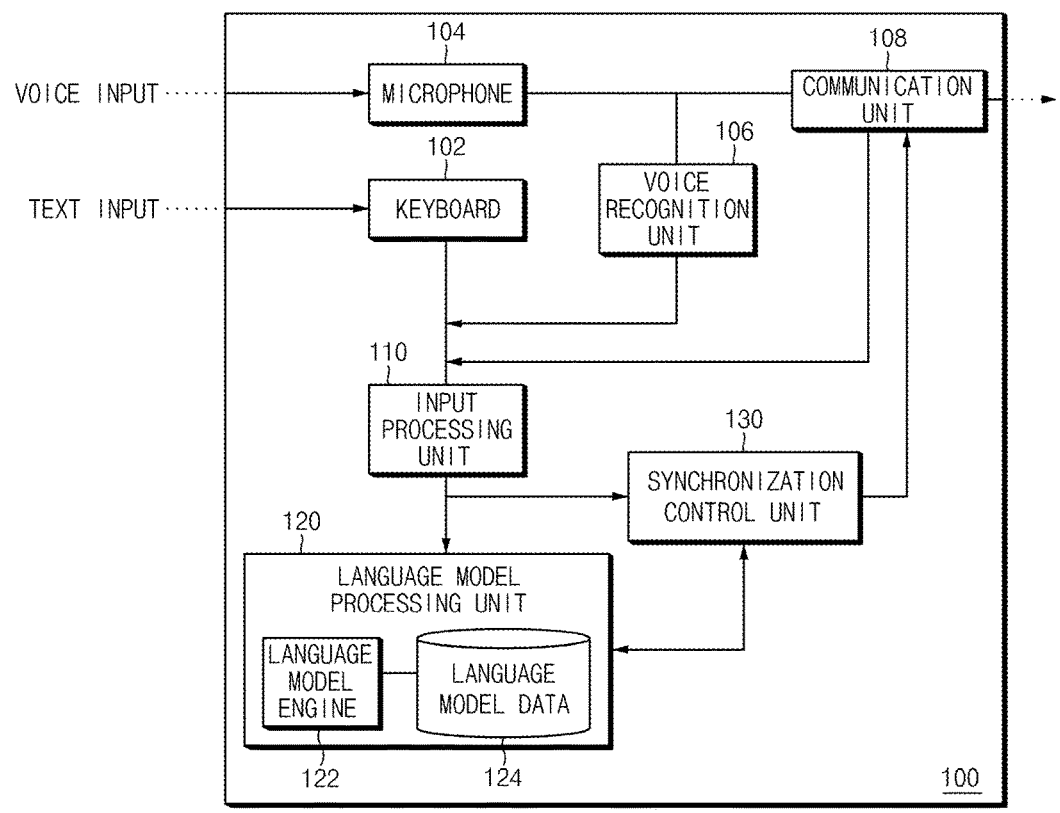
FIG. 2 illustrates an example of an electronic device according to an embodiment of the present disclosure.

FIG. 2 illustrates an example of an electronic device according to an embodiment of the present disclosure.

Referring to FIG. 2, the first electronic device 100 may obtain a sentence input from the user. For example, the first electronic device 100 may receive a text input through a keyboard 102. The text input received through the keyboard 102 may be provided as a text input to an input processing unit 110. Here, the keyboard 102 may be a hardware-type physical keyboard or a software module-type SIP.

In an embodiment of the present disclosure, the first electronic device 100 may obtain a sentence input from a voice input of the user. For example, the first electronic device 100 may obtain a speech of the user through a microphone 104, and may convert the speech into a digital signal. For example, if the user executes an application related to voice recognition or voice recognition is constantly enabled, the speech of the user may be obtained through the microphone 104. The microphone 104 may include an analog-to-digital converter (ADC) for converting an analog signal to a digital signal. However, in various embodiments of the present disclosure, the ADC, a digital-to-analog converter (DAC), and various signal processing or pre-processing circuits may be included in a separate control module (e.g., a processor 210 of FIG. 3).

According to an embodiment of the present disclosure, a voice input obtained by the microphone 104 or an audio signal (or a voice signal) generated based on the voice input may be provided to a voice recognition unit 106. The voice recognition unit 106 may be equipped with, for example, an engine or a module for performing an auto speech recognition (ASR) function. Here, the audio signal provided to the voice recognition unit 106 may be a signal pre-processed for voice recognition. For example, the audio signal may be a signal that has undergone noise filtering or to which an equalizer suitable for a human voice is applied.

The voice recognition unit 106 may perform voice recognition on the audio signal received from the microphone 104. The voice recognition unit 106 may perform isolated word recognition, connected word recognition, large vocabulary recognition, or the like on the voice input (audio signal). The voice recognition performed by the voice recognition unit 106 may be implemented as a speaker-independent type or a speaker-dependent type. The voice recognition unit 106 may not be necessarily one voice recognition engine, and may include two or more voice.

The voice recognition unit 106 may convert the voice input into a text. The voice recognition unit 106 may convert the voice input of the user into a text input, and may provide the text input as a sentence input to the input processing unit 110.

In an embodiment of the present disclosure, the first electronic device 100 may transfer the voice input obtained through the microphone 104 to the server 300 via a communication unit 108. The server 300 may perform voice recognition (e.g., ASR) on the voice input, and may provide a result of the voice recognition to the first electronic device 100. In the case where voice recognition is performed in the server 300, the same voice recognition as that of the first electronic device 100 may be performed or the voice recognition may be performed differently. For example, the first electronic device 100 may perform the ASR, but the server 300 may generate a voice recognition result through the ASR, natural language understanding (NLU), dialog management (DM), or a combination thereof and may provide the voice recognition result to the first electronic device 100. However, in various embodiments of the present disclosure, the above-mentioned voice recognition performed by the server 300 may be performed by the processor 210 or the voice recognition unit 106 of the electronic device 100.

The input processing unit 110 may collect a sentence input provided as a voice or text, and may obtain word information related to collected information. The input processing unit 110 may obtain the word information based on a specific input, for example, an input of a return key (button) or a punctuation mark ".". In this case, even if a user input fails to complete a sentence (e.g., "I read a book and the book's title is") or is a non-sentence, the input processing unit 110 may obtain the user input as a sentence input. Furthermore, in the case where a sentence input is provided by a voice, the input processing unit 110 may obtain the word information based on an interval between voice inputs or a unit of voice input to be processed by the voice recognition unit 106. For example, the input processing unit 110 may obtain the word information such as "I am reading a book".

A language model processing unit 120 may analyze a word or sentence input provided by the input processing unit 110 using a language model engine (algorithm), and may update language model data 124. For example, in the case where a sentence input such as "I am reading a book" is provided, the language model processing unit 120 may associate words of the sentence input with each other according to a leading/lagging relationship between consecutive words, such as [<start>, I], [I, am], [am, reading], [reading, a], [a, book], [book, <end>]. The language model processing unit 120 may calculate, based on the language model data 124, relational information such as a probability that a specific word will follow another word. For example, [I, am, 0.2] represents that a probability that "I" will be followed by "am" is 0.2 (20%). This probability value may be obtained based on pre-stored language model data and the relational information based on a sentence input. In one example, [am, reading, 1] may represent that a probability that "am" will be followed by "reading" is 1 (100%), and, in this case, the relational information may represent that the case where "am" is followed by "reading" occurs for the first time and "am" has not been followed by any word but "reading". The probability value of 1 may be assigned to a word combination which occurs for the first time as described above, or a default value (e.g., 0.1, 0.02, etc.) defined by a language model engine 122 may also be assigned. The language model processing unit 120 may update the language model data 124 using the word information obtained from a sentence input as described above and the relational information obtained based on the word information and the language model data 124.

The above-mentioned example is provided on the assumption that N is 2 in an N-gram language model, i.e., analysis is performed in units of two consecutive words. In various embodiments of the present disclosure, N may be equal to or larger than 3. For example, in the case where N is 3, the model processing unit 120 may determine the relational information by dividing the sentence input into units such as [am reading, a] and [reading a, book]. For example, in a 2-gram model, since "a" may be followed by many words, a probability of appearance of "book" may be set to be relatively low, and, as a result, an inappropriate word for following "I am reading a" may be possibly recommended. However, in a 3-gram model, words, more particularly, nouns, which may follow "reading a" are relatively limited, and, as a result, the probability of appearance of "book" may be set to be relatively high. An exemplary concept of a language model is described below with reference to FIG. 5.

If the language model data 124 is updated in the language model processing unit 120, the language model processing unit 120 may provide, to a synchronization control unit 130, a signal indicating that the language model data 124 has been updated. In this case, the language model processing unit 120 may generate synchronization information and may provide the synchronization information to the synchronization control unit 130. The synchronization control unit 130 may determine a synchronization method by comparing the synchronization information and other synchronization information obtained from the server 300. A relevant description is provided below with reference to FIG. 9.

Figure 3:
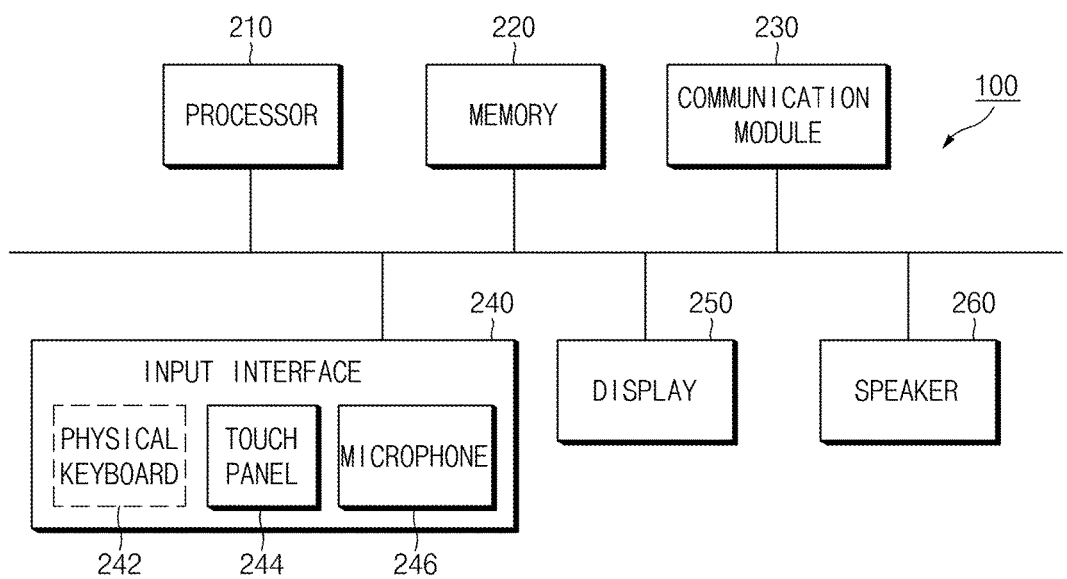
FIG. 3 illustrates another example of an electronic device according to an embodiment of the present disclosure.

FIG. 3 illustrates another example of an electronic device according to an embodiment of the present disclosure.

Elements of the electronic device 100 described with reference to FIG. 2 are distinguished by a function. In other words, some of the elements illustrated in FIG. 2 may be implemented as software. For example, the keyboard 102 may be implemented as not an actual physical keyboard but a virtual keyboard output to a display of the first electronic device 100.

Referring to FIG. 3, the electronic device 100 of FIG. 3 may include the processor 210, a memory 220, a communication module 230, an input interface 240, a display 250, and a speaker 260. The memory 220 may store instructions for performing the functions of each element described above with reference to FIG. 2, and the instructions may be executed by the processor 210. For example, the processor 210 may update the language model data 124 stored in the memory 220 based on a sentence input obtained through the input interface 240, and may allow the communication module 230 to transmit the language model data 124 to the server 300.

The processor 210, the memory 220, the communication module 230, the input interface 240, the display 250, and the speaker 260 may exchange control messages or data via a bus. FIG. 3 illustrates elements for describing various elements of the present disclosure, and arbitrary elements not shown may be added. For example, various sensors or a subscriber identity module may be added.

The processor 210 may control the first electronic device 100 and may execute instructions for performing operations according to various embodiments of the present disclosure. For example, the processor 210 may perform a voice recognition function or may perform an operation of updating the language model data 124.

The memory 220 may store the language model data 124. The language model data 124 may include a plurality of words and relational information among the words which may be generated by a combination of the words. For example, the language model data 124 may include a first word, a second word, and the relational information associated with the first word or the second word. Here, the relational information associated with the first word may include a probability that the first word will be positioned at a start of a sentence, a probability that the first word will follow the second word, and/or a probability that the first word will be positioned at an end of the sentence. In the case where the language model engine 122 uses an N-gram model where N is at least 3, the second word in the "probability that the first word will follow the second word" may include a plurality of words (e.g., two words).

In various embodiments of the present disclosure, the relational information may additionally include various information. For example, the number of times a specific word is input, an input time (recent time, previous time) of the specific word, a device (e.g., the first electronic device 100 or the second electronic device 200) to which the specific word is input, or weights applied to the number of times, the input time, and the input device in a predefined manner may be applied to the relational information. For example, in the case where "I read a book" has been input to the first electronic device 100 and "I read a note" has been input to the second electronic device 200, "a book" may be recommended if "I read" is input to the first electronic device 100 and "a note" may be recommended if "I read" is input to the second electronic device 200.

The communication module 230 may communicate with the server 300. The communication module 230 may functionally correspond to the communication unit 108 of FIG. 2.

The input interface unit 240 may correspond to an interface for obtaining a sentence input from the user. For example, the input interface 240 may include various input modules for receiving various user inputs such as a text or a voice in the electronic device 100. For example, the input interface 240 may include at least one of a physical keyboard 242, a touch panel 244 for receiving a touch input, or a microphone 246 for receiving a voice input. In the case of an electronic device which recognizes a touch input, such as a smartphone or a tablet, the touch panel 244 may be integrated with the display 250. For example, the display 250 may be implemented by pressure-bonding a display panel, the touch panel 244, and a cover glass. However, in various embodiments of the present disclosure, the display 250 may not support a touch function and may be implemented with a display panel and a cover glass. In various embodiments of the present disclosure, the processor 210 may output a predicted word to the display 250 based on a language model, and may obtain a sentence input based on a touch input that occurs on the display 250. Meanwhile, the electronic device 100 may include, as a type of an output module, the speaker 260 for outputting a voice (or a sound) together with the display 250.

Figure 4:
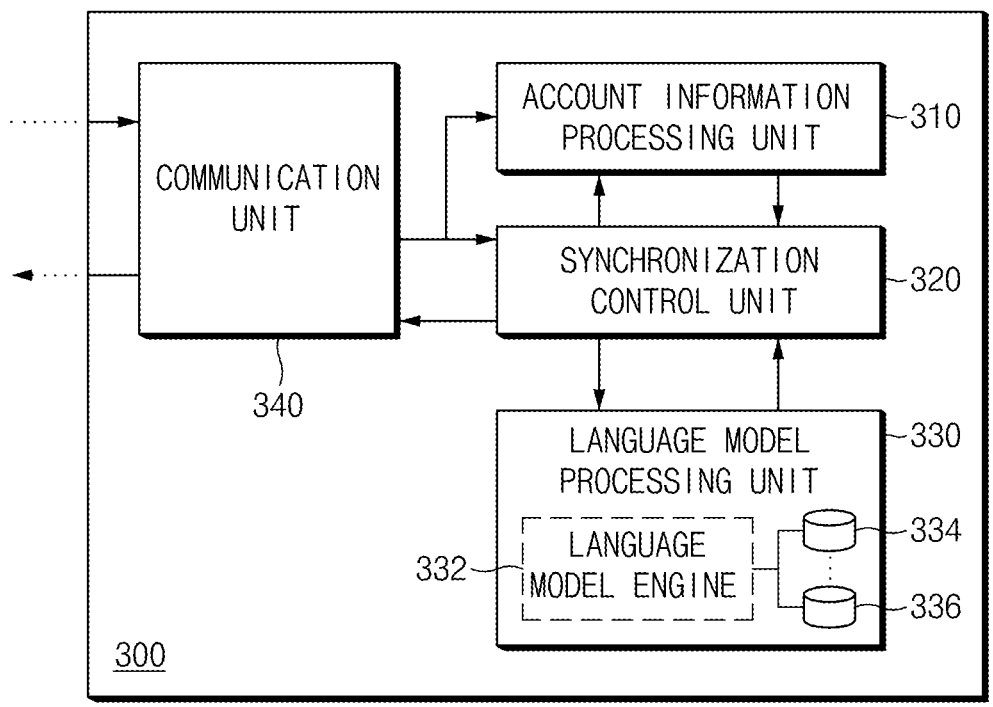
FIG. 4 illustrates an example of a synchronization server according to an embodiment of the present disclosure.

A configuration of the server 300 is described below with reference to FIG. 4. In FIG. 4, elements of the server 300 are distinguished by function, and the functions of the server 300 described with reference to FIG. 4 may be appropriately performed by a control module or a communication module of the server 300.

FIG. 4 illustrates an example of a synchronization server according to an embodiment of the present disclosure.

Referring to FIG. 4, the server 300 may include an account information processing unit 310, a synchronization control unit 320, a language model processing unit 330, and a communication unit 340.

The communication unit 340 may communicate with the first electronic device 100 or the second electronic device 200. For example, the communication unit 340 may receive the language model data 124 from the first electronic device 100, or may transmit language model data 334 or 336 of the server 300 to the first electronic device 100. Furthermore, the communication unit 340 may transmit a synchronization notification message (e.g., a push message) to the first electronic device 100 or the second electronic device 200.

The communication unit 340 may provide, to the account information processing unit 310, information on the first electronic device 100 in order to identify a user account corresponding to the first electronic device 100. This information may be provided together with the language model data 124 or the synchronization request. In an embodiment of the present disclosure, the communication unit 240 may transfer received information to the synchronization control unit 320, and the synchronization control unit 320 may send, to the account information processing unit 310, a request for reference to a user account of the first electronic device 100.

The account information processing unit 310 may identify the user account (e.g., user_a@account.com) based on the information on the first electronic device 100, and may provide the user account to the synchronization control unit 320. The synchronization control unit 320 may provide identified user account information to the language model processing unit 330, and may check corresponding language model data and synchronization information in response to the user account information.

The language model processing unit 330 may include a language model engine 332 and the language model data 334 or 336. The language model processing unit 330 may include different language model data based on registered user accounts. The language model processing unit 330 may include a plurality of language models besides the language model engine 332 illustrated in FIG. 4. For example, in the case where the account information processing unit 310 determines that a user account uses a first-type language model as a result of identifying the user account, a corresponding language model engine and language model data of the account may be confirmed.

In various embodiments of the present disclosure, the language model engine 332 may be omitted from the language model processing unit 330. For example, in the case where the server 300 does not support updating of language model data and merely performs an operation of replacing language model data, the language model engine 332 may be omitted. However, in another embodiment of the present disclosure, the server 300 may include the specific language model engine 332 for updating or merging language model data of the server 300 based on the language model data 124 or sentence input information received from the first electronic device 100.

Furthermore, in various embodiments of the present disclosure, the language model processing unit 330 may manage a plurality of language model data corresponding to one user account. For example, different language model data may be used according to a text field (e.g., an Internet address input field, an email address input field, an email text input field, a message text input field, etc.) or an application (e.g., a messenger application, an email application, a web application, etc.) used in the first electronic device 100. A relevant description is provided below with reference to FIG. 14.

Figure 5:
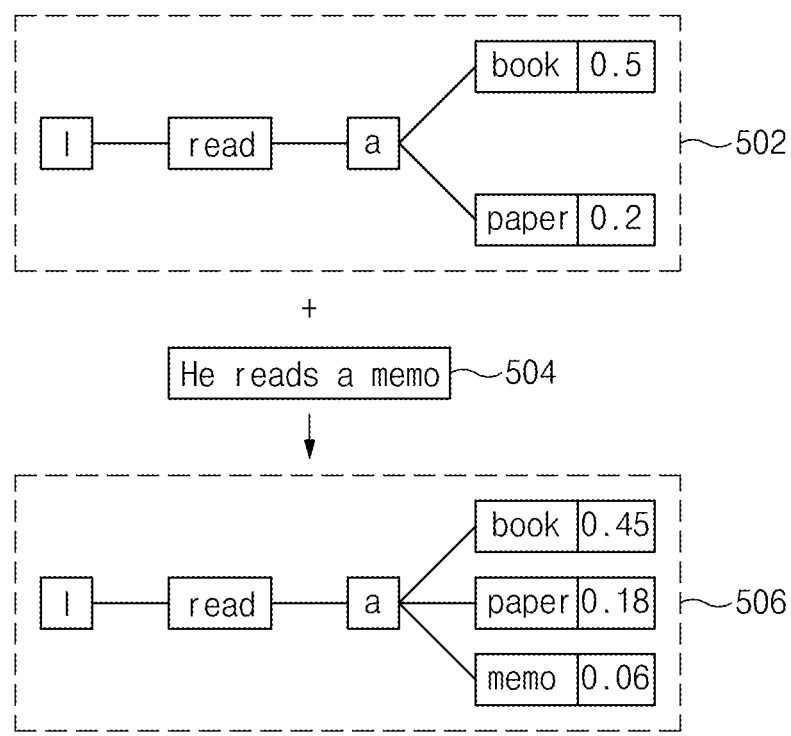
FIG. 5 conceptually illustrates a language model according to an embodiment of the present disclosure.

FIG. 5 conceptually illustrates a language model according to an embodiment of the present disclosure.

Referring to FIG. 5, existing language model data 502 is updated by a sentence input 504. According to the language model data 502, "book" has a probability of 0.5 of being input after "I read a", and "paper" has a probability of 0.2 of being input after "I read a". In this state, if the sentence input 504 such as "He reads a memo" occurs, the processor 210 may obtain word information from the sentence input 504, and may produce an updated language model data 506 based on the obtained word information and the existing language model data 502. For example, relational information of words that may follow "a" may be newly defined. For example, regarding the relational information of each word, "book" may be decreased to 0.45, "paper" may be decreased to 0.18, and "memo" may be increased (generated) to 0.06.

In the example illustrated in FIG. 5, in the case where the relational information is analyzed in units of three words (N=3) in a language model, a probability that "book" will follow "read a" may correspond to 0.5 and a probability that "paper" will follow "read a" may correspond to 0.2 in the language model data 502. Here, if the sentence input 504 is obtained, the processor 210 may define the relational information for [reads a, memo]. In this case, the processor 210 may apply, to the sentence input 504, a morphological analysis algorithm (e.g., table parsing), a part-of-speech tagging algorithm (e.g., hidden Markov model (HMM)), a phrase/clause analysis algorithm, or a syntax analysis algorithm. The processor 210 may analyze [reads a] in the form of [read a] or [read [article]], and may place "memo" at a node of the same layer as that of "book" and "paper". In this manner, the processor 210 may obtain appropriate relational information for [read a], [reads a], or even for various grammatical modifications such as [read a], [read the], [reads any], etc.

The language model data illustrated in FIG. 5 is a simplified version for convenience, and may be implemented with more complicated tree structures and lower probabilities. For example, there exist many words that may be input after "to the", but a probability that "new" will follow "to the" may be 0.00301555 and both a probability that "next" will follow "to the" and a probability that "point" will follow "to the" may be 0.00282858, and other words may have lower probabilities, based on a language model and an input history of the user. In this case, the display 250 may display "new, next, point" as recommended words after "to the" is input to an input field.

In the above example, if the user deletes "point" from predicted words through a predetermined input (e.g., a long touch), the probability that "point" will follow "to the" may be decreased to 0 or an arbitrary number or by an arbitrary ratio in the language model. A list of deleted words may be managed in a separate database, and a process of synchronizing a deleted word database is described below with reference to FIG. 12.

Figure 6:
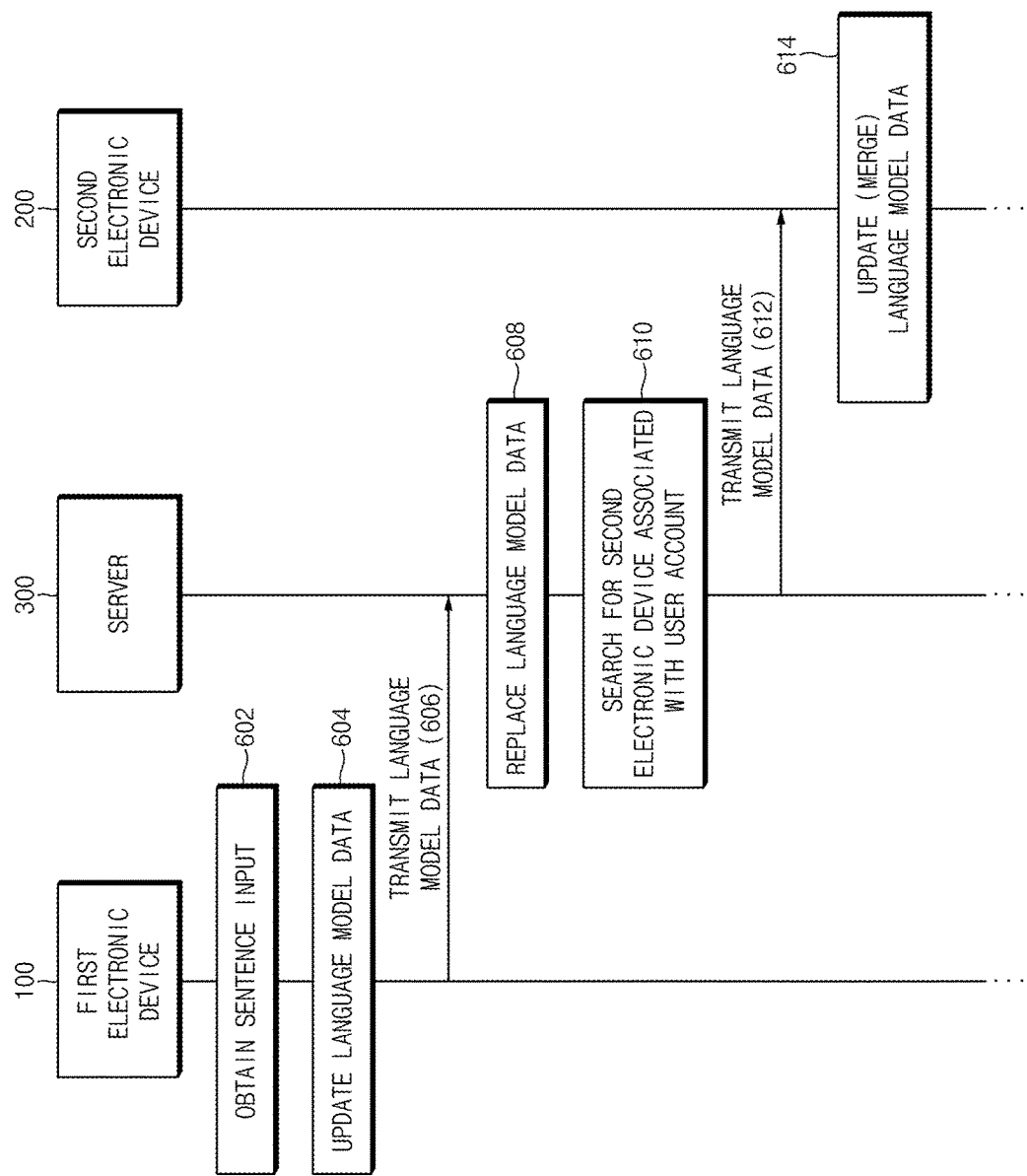
FIG. 6 illustrates a synchronization process of a language model according to an embodiment of the present disclosure.

FIG. 6 illustrates a synchronization process of a language model according to an embodiment of the present disclosure. Descriptions that are similar or correspond to or overlap with the above descriptions may not be provided below.

Referring to FIG. 6, the first electronic device 100 may obtain a sentence input in operation 602. In operation 604, the first electronic device 100 may update language model data stored in the first electronic device 100. For example, the processor 210 may update the language model data based on at least one word included in the sentence input and the relational information associated with the at least one word. Here, the relational information may be generated based on word information obtained from the sentence input and the language model data previously stored in the first electronic device 100. In an embodiment of the present disclosure, in the case where the language model data does not exist in the first electronic device 100, the first electronic device 100 may generate the language model data in operation 604.

In operation 606, the first electronic device 100 may transmit updated language model data to the server 300. In operation 608, the server 300 may replace existing language model data with received language model data. In other words, the language model data (e.g., the language model data 334) stored in the server 300 may be replaced with the language model data (e.g., the language model data 124) received from the first electronic device 100.

In operation 610, the server 300 may search for the second electronic device 200 associated with a user account of the first electronic device 100. For example, the server 300 may search for an electronic device associated with a user account (e.g., user_a@samsung.com, user_a@gmail.com, user_a@facebook.com, etc.) which is the same as the user account (user_a@account.com) of the first electronic device 100 or is registered as the same user as that of the user account (user_a@account.com) or has a predetermined relationship (e.g., family) therewith.

In operation 612, the server 300 may transmit language model data to the second electronic device 200. The language model data transmitted in operation 612 may correspond to the language model data transmitted to the server 300 in operation 606. In operation 614, upon receiving the language model data, the second electronic device 200 may merge language model data stored therein with the received language model data.

Before operation 612 is performed, the server 300 may transmit, to the second electronic device 200, a synchronization request message indicating that language model data has been updated with up-to-date language model data. Upon receiving a response to the synchronization request message from the second electronic device 200, the server 300 may transmit the language model data based on the response.

After merging the language model data, the second electronic device 200 may transfer the merged language model data back to the server 300, and the server 300 may replace, with the merged language model data, the language model data substituted in operation 608 and may transmit the merged language model data to the first electronic device 100, thereby synchronizing the language model data of the first electronic device 100, the server 300, and the second electronic device 200.

FIG. 6 briefly illustrates a process in which the first and second electronic devices 100 and 200 synchronize language model data through the server 300. Described below with reference to FIGS. 7 to 12 are processes in which synchronization information for performing synchronization is checked and synchronization notification messages are transmitted/received among different devices.

Figure 7:
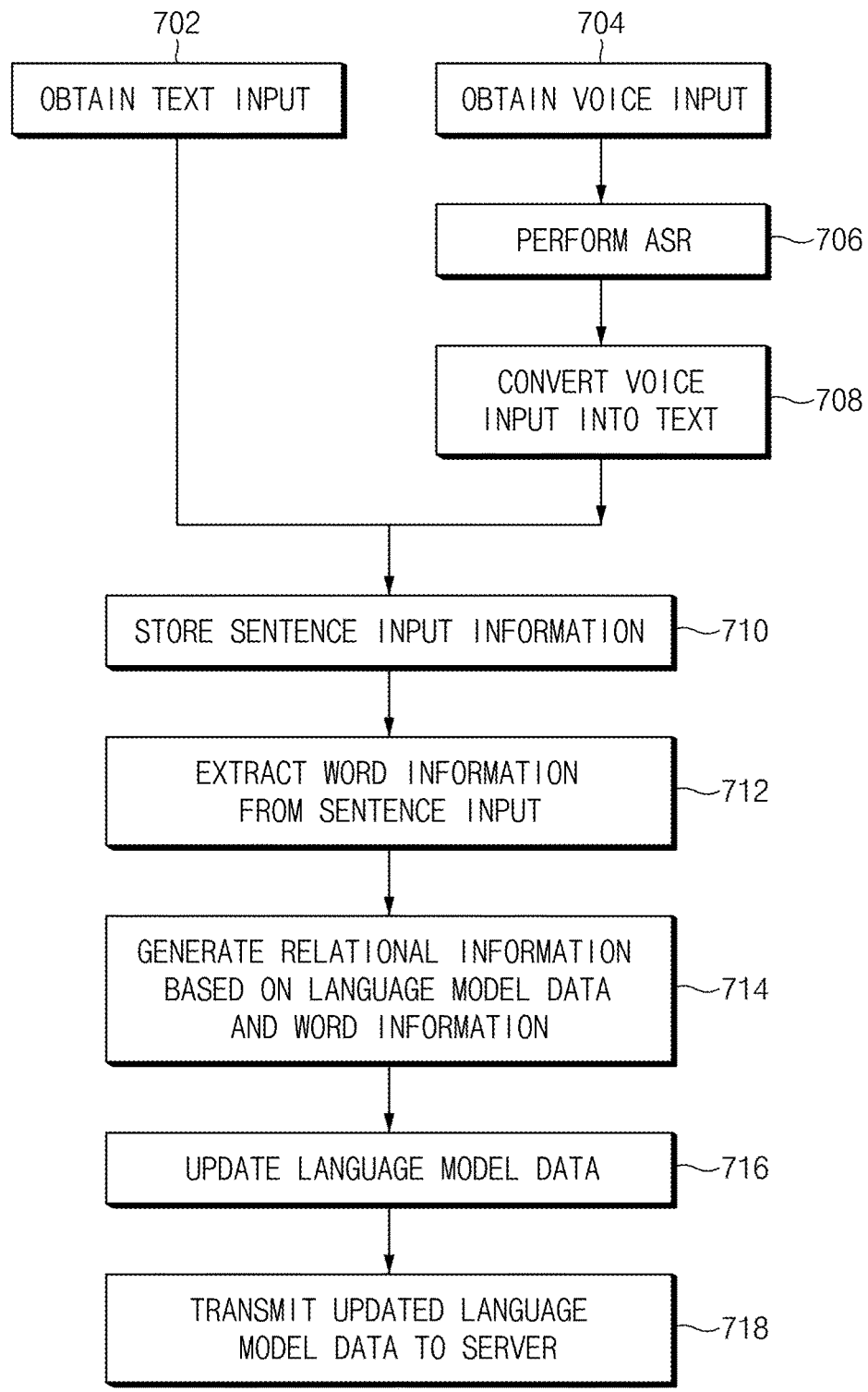
FIG. 7 illustrates a process in which an electronic device provides, for the purpose of language model synchronization, language model data to a server according to an embodiment of the present disclosure.

FIG. 7 illustrates a process in which an electronic device provides, for the purpose of language model synchronization, language model data to a server according to an embodiment of the present disclosure.

The process of FIG. 7 may correspond to a process in which the first electronic device 100 updates language model data and provides the updated language model data to the server 300. For example, the process of FIG. 7 may correspond to operations 602 to 606 of FIG. 6.

Referring to FIG. 7, in operation 702, the first electronic device 100 may obtain a text input through a physical keyboard or a soft keyboard (e.g., SIP). Furthermore, the first electronic device 100 may obtain a voice input from the user in operation 704, may perform voice recognition (e.g., ASR) on the obtained voice input in operation 706, and may obtain a text based on a result of the voice recognition in operation 708. As described above, a text input in operation 702 or a voice input in operation 704 may be obtained as a sentence input.

In operation 710, the first electronic device 100 may store sentence input information. The stored sentence input information may be provided to the server 300 in order to update a language model of another electronic device which uses a different language model from that of the first electronic device 100 A relevant embodiment is described below with reference to FIG. 11.

In operation 712, the first electronic device 100 may extract word information from the sentence input. The first electronic device 100 may extract one or more words included in a sentence and an arrangement order of the words.

In operation 714, the first electronic device 100 may generate relational information based on the language model data and the word information. In operation 716, the first electronic device 100 may update the language model data based on the word information obtained in operation 712 and the relational information generated in operation 714. In operation 718, the first electronic device 100 may transmit updated language model data to the server 300. In operation 718, the first electronic device 100 may transmit, to the server 300, identification information for identifying the first electronic device 100 (or the user thereof), the sentence input information, or synchronization information corresponding to language model data in addition to the updated language model data.

Figure 8:
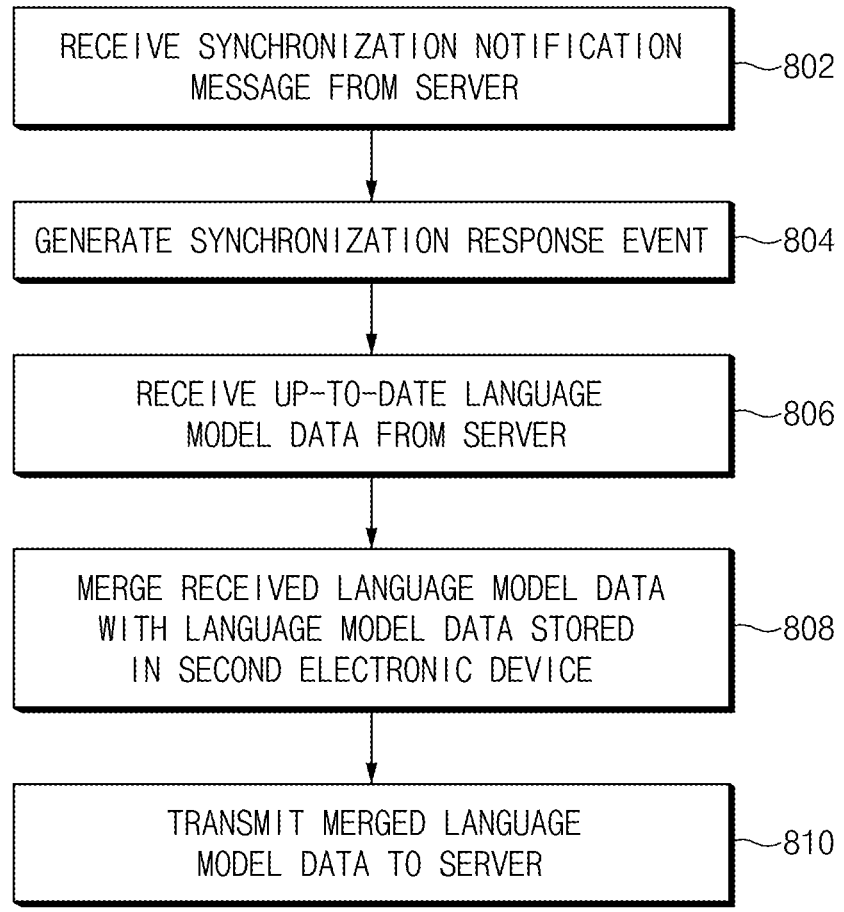
FIG. 8 illustrates a process of synchronizing a language model based on data received from a server in an electronic device according to an embodiment of the present disclosure.

FIG. 8 illustrates a process of synchronizing a language model based on data received from a server in an electronic device according to an embodiment of the present disclosure.

Referring to FIG. 8, a process is illustrated in which the second electronic device 200 receives language model data from the server 300 and performs synchronization. For example, the process of FIG. 8 may correspond to or follow operations 612 and 614 of FIG. 6.

Once the server 300 replaces language model data thereof using language model data received from the first electronic device 100, the server 300 may transmit, to the second electronic device 200, a synchronization notification message indicating new language model data update and inducing synchronization. In operation 802, the second electronic device 200 may receive the synchronization notification message.

In operation 804, the second electronic device 200 may generate a synchronization response event. For example, if the synchronization notification message is provided as a push notification to a display of the second electronic device 200, and an input for performing or approving synchronization is generated by the user, the second electronic device 200 may transmit, to the server 300, a response for instructing the server 300 to start synchronization. In an embodiment of the present disclosure, the second electronic device 200 may be set to automatically proceed with synchronization upon receiving the notification message, or may be set to proceed with synchronization if the second electronic device 200 is connected to Wi-Fi after receiving the notification message. Alternatively, the second electronic device 200 may be set to start synchronization at a specified time (e.g., twelve at night).

In operation 806, the second electronic device 200 may receive up-to-date language model data from the server 300. In operation 808, the second electronic device 200 may merge language model data stored therein with the received language model data. In this operation, regarding overlapping word data between the two language model data, the second electronic device 200 may recalculate a probability (relational information) of the overlapping word data with respect to the size of the entire language model data.

The language model data (e.g., version 1.0) stored in the server 300 and the first electronic device 100 may be up-to-date language model data before operation 806, but, after operation 808 is performed, merged language model data (e.g., version 1.2) may be up-to-date language model data. Therefore, in operation 810, the second electronic device 200 may transmit the merged language model data to the server 300, and the server 300 may transmit, to the first electronic device 100, the language model data received from the second electronic device 200.

However, in an embodiment of the present disclosure, if no sentence input has been provided to the first electronic device 100 since transmission of language model data (e.g., version 1.0) from the first electronic device 100 to the server 300 until the first electronic device 100 receives language model data (e.g., version 1.2) from the server 300, the language model data of the first electronic device 100 may be the same as the language model data of version 1.2 even if it is merged. However, if any sentence input has been provided to the first electronic device 100 since transmission of language model data from the first electronic device 100 to the server 300 until the first electronic device 100 receives language model data from the server 300, and the language model data of the first electronic device 100 is modified (e.g., version 1.1), new language model data (e.g., version 1.3) may be generated if the language model data of version 1.2 is received and merged. In particular, in the case where user inputs continue to be provided to the first electronic device 100 and the second electronic device 200 simultaneously or with slight time difference, an operation of synchronization through the server 300 may be repetitively performed. Therefore, in an embodiment of the present disclosure, the first electronic device 100 or the second electronic device 100 may be set so as not to transmit language model data to the server 300 for a certain time or until a certain condition is satisfied even if a sentence input is provided to the first electronic device 100 or the second electronic device 200 after the first electronic device 100 or the second electronic device 200 receives a synchronization request message (e.g., operation 802) from the server 300 and performs synchronization.

Figure 9:
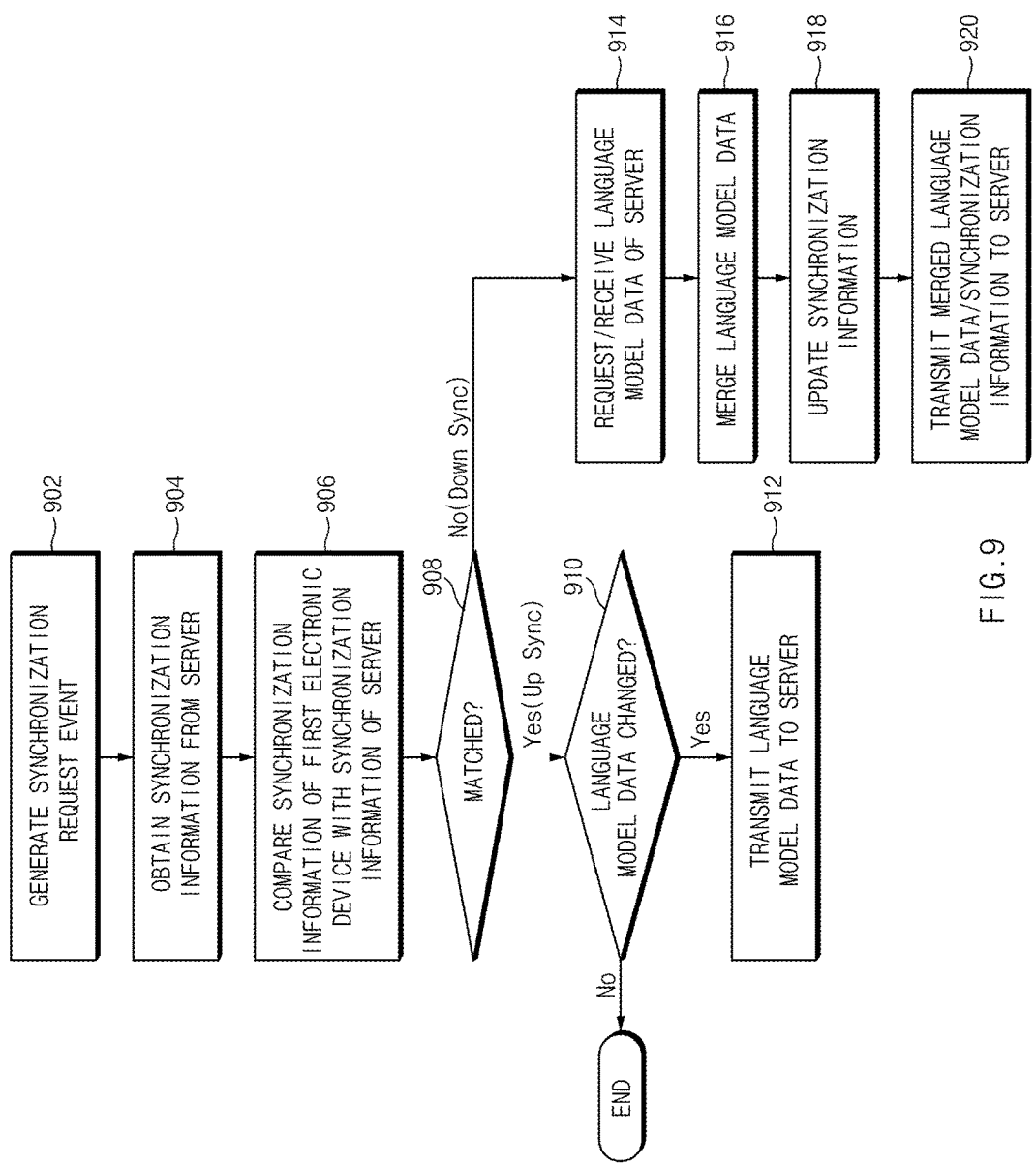
FIG. 9 illustrates a process of determining a synchronization method in an electronic device according to an embodiment of the present disclosure.

FIG. 9 illustrates a process of determining a synchronization method in an electronic device according to an embodiment of the present disclosure.

The first electronic device 100 or the second electronic device 200 may perform language model synchronization by transmitting language model data thereof to the server 300 (up synchronization) or receiving language model data from the server 300 (down synchronization). For convenience, a method of determining an up synchronization or down synchronization method is described below with respect to the first electronic device 100.

Referring to FIG. 9, in operation 902 a synchronization request event may occur. For example, a synchronization period set in the first electronic device 100 may arrive or synchronization may be performed forcibly by an input from the user. The synchronization notification message of operation 802 of FIG. 8 may be set as one of the synchronization request event.

If the synchronization request event occurs, the first electronic device 100 (e.g., the communication module 230) may request the server 300 to send synchronization information of language model data stored in the server 300, and may receive the synchronization information of the server 300 from the server 300 in operation 904. In operation 906, the first electronic device 100 (e.g., the processor 210) may compare synchronization information (e.g., first synchronization information) of language model data stored in the first electronic device 100 with the received synchronization information (e.g., second synchronization information) of the language model data stored in the server 300. Such synchronization information may include last synchronization time information (e.g., time stamp information) of language model data. Furthermore, the synchronization information may additionally include information on a device in which synchronization has been performed.

In an embodiment of the present disclosure, every time the language model data of the first electronic device 100 is updated, the first electronic device 100 may store, in the language model data or a separate memory space, time stamp (TS) information about a last update time. That is, if a change occurs in the language model data (e.g., a language model is updated based on a text or voice input obtained through the input interface of the electronic device 100 or the language model is merged based on data received from the server 300), the first electronic device 100 may record the time stamp information of a time of occurrence of the change. For example, in the case where the language model data stored in the electronic device 100 is updated autonomously at TS1, TS2, and TS3, the language model data is updated (merged) through up or down synchronization with the server 300 at TS4, and the language model data is updated based on a sentence input at TS5 and TS6, the synchronization information of the language model data of the first electronic device 100 may include the time stamp information (e.g., TS4) of the language model data obtained when synchronization between the server 300 and the first electronic device 100 is performed.

In operation 908, the first electronic device 100 may determine whether the two pieces of the synchronization information match each other. For example, if the first synchronization information indicates that synchronization between the first electronic device 100 and the server 300 was performed at 2 a.m. on Jan. 1, 2015, it may be determined whether the second synchronization information contains the same information as that of the first synchronization information.

If it is determined that the second synchronization information matches the first synchronization information, i.e., if the second synchronization information also indicates that synchronization between the first electronic device 100 and the server 300 was performed at 2 a.m. on Jan. 1, 2015, the first electronic device 100 may determine, in operation 910, whether the language model data has been changed by a sentence input to the first electronic device 100 since that time. If the language model data has not been changed, the process may be ended since the language model data of the first electronic device 100 has already been synchronized with that of the server 300. If the language model has been changed, the first electronic device 100 may transmit the changed language model data thereof to the server 300 in operation 912. In this case (up synchronization), the first electronic device 100 may modify the synchronized information based on a time at which the language model data is transmitted to the server 300, and may provide the modified synchronization information to the server 300.

If the second synchronization information does not match the first synchronization information in operation 908, for example, if the server 300 has performed synchronization with the second electronic device 200 after the last synchronization with the first electronic device 100, the first electronic device 100 may request the server 300 to send the language model data stored therein and may receive the language model data in operation 914. In operation 916, the first electronic device 100 may merge the received language model data with the language model data stored in the first electronic device 100. If the merging is completed, the first electronic device 100 may update the synchronization information in operation 918, and may transmit the merged language model data and the updated synchronization information to the server 300 in operation 920.

Figure 10:
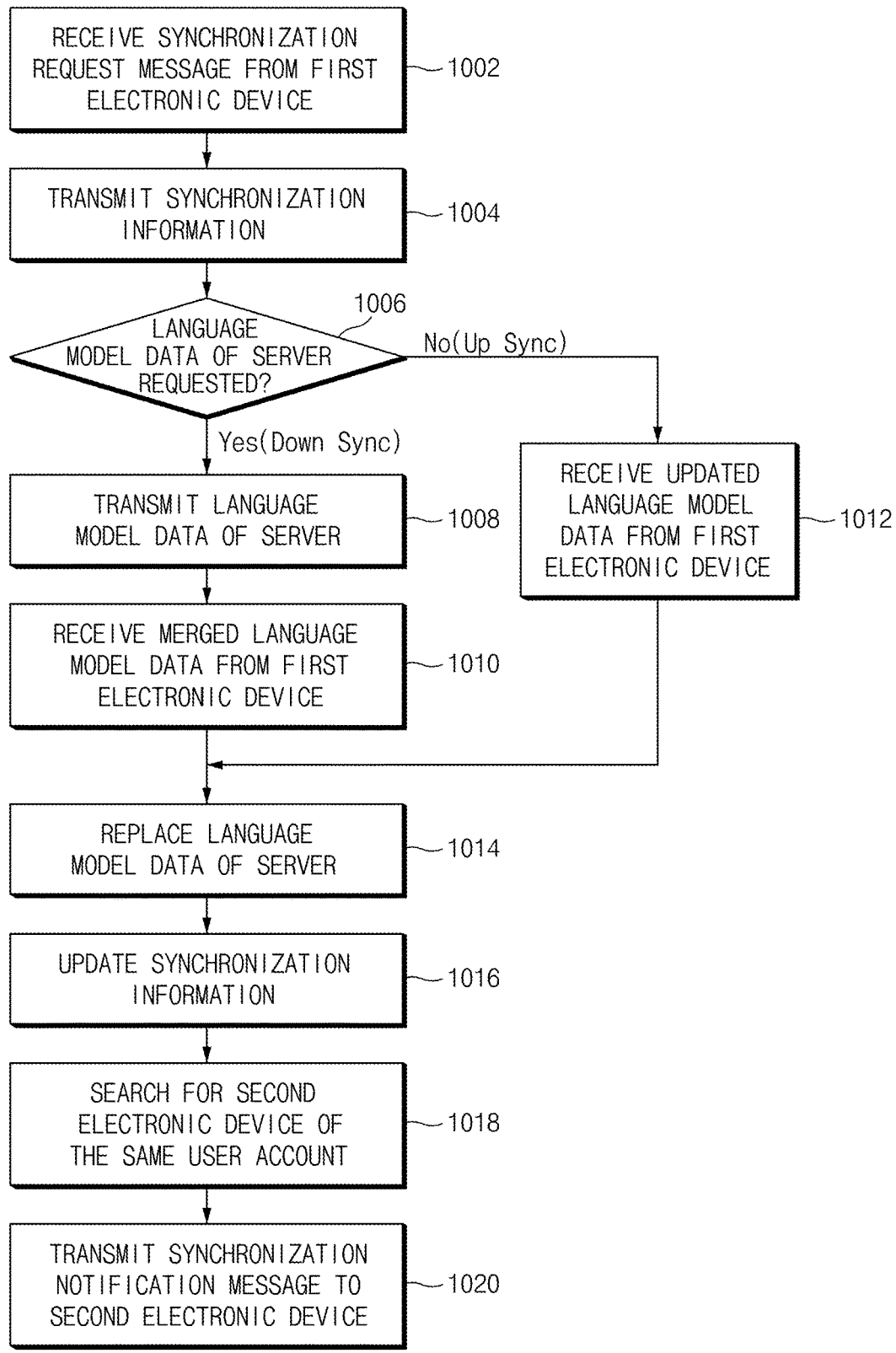
FIG. 10 illustrates a process of performing language model synchronization in a server according to an embodiment of the present disclosure.

FIG. 10 illustrates a process of performing language model synchronization in a server according to an embodiment of the present disclosure.

Referring to FIG. 10, in operation 1002 the server 300 may receive a synchronization request message from the first electronic device 100. In operation 1004, the server 300 may transmit the synchronization information of the language model data stored in the server 300 to the first electronic device 100 in response to the synchronization request message. In the case where the first electronic device 100 determines the down synchronization method, the server 300 may receive, from the first electronic device 100, a request for the language model data of the server 300 in operation 1006. However, in the case where the first electronic device 100 determines the up synchronization method, the server 300 may receive, from the first electronic device 100, the language model data of the first electronic device 100 in operation 1012. In this case, updated synchronization information may be received together with the language model data from the first electronic device 100.

If the language model of the server 300 is requested in operation 1006, the server 300 may transmit the language model data to the first electronic device 100 in operation 1008. If the first electronic device 100 receives the language model data and completes merging of the received language model data with its own language model data, the server 300 may receive the merged language model data from the first electronic device 100 in operation 1010. In this case, synchronization information updated based on the merged language model data may be received together therewith.

In operation 1014, the server 300 may replace the language model data previously stored therein with the language model data received from the first electronic device 100. Furthermore, in operation 1016, the synchronization information on the language model data of the server 300 may be updated based on the synchronization information (or language model data) received from the first electronic device 100.

In operation 1018, the server 300 may search for the second electronic device 200 associated with a user account that is the same as (or related to) that of the first electronic device 100. In operation 1020, the server 300 may transmit a synchronization notification message to the second electronic device 200. After operation 1020, the process of FIG. 8 or FIG. 9 may be performed in the second electronic device 200.

Figure 11:
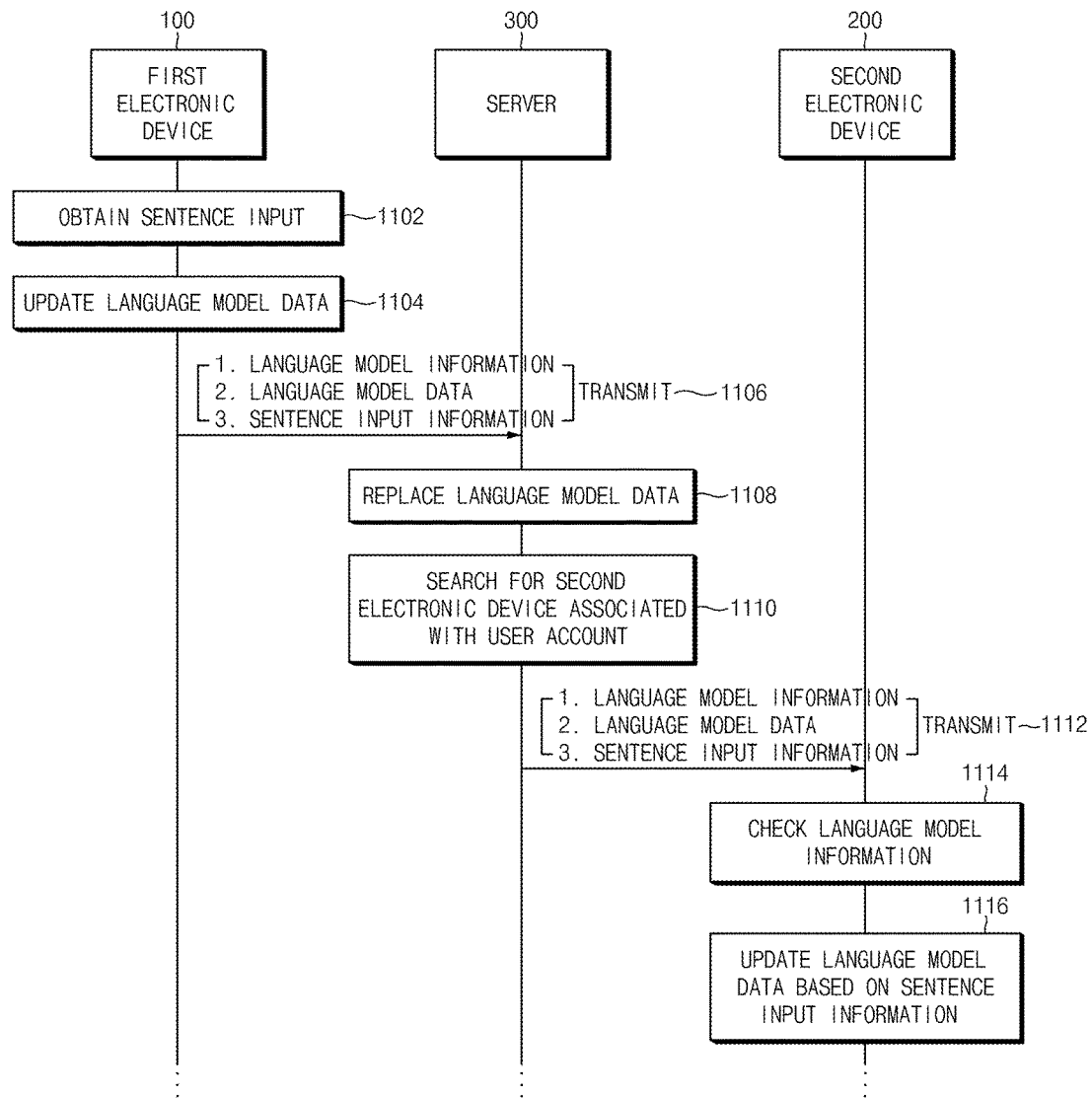
FIG. 11 illustrates a process of synchronization among electronic devices using heterogeneous language models according to an embodiment of the present disclosure.

FIG. 11 illustrates a process of synchronization among electronic devices using heterogeneous language models according to an embodiment of the present disclosure.

In the case of using different language models, merging language model data may be impossible or a result of merging may be inefficient since different algorithms are used. However, according to an embodiment of the present disclosure, even if different language models are used, a user's sentence input may be processed according to respective language models, so that similar user experiences may be provided by providing information on a sentence input.

Referring to FIG. 11, the first electronic device 100 may obtain a sentence input in operation 1102, and may update language model data in operation 1104. Here, the first electronic device 100 may use a first-type language model.

In operation 1106, the first electronic device 100 may transmit language model type information, language model data, and sentence input information to the server 300. In operation 1108, the server 300 may replace first-type language model data corresponding to a user account based on the received language model type information.

In operation 1110, the server 300 may search for the second electronic device 200 associated with the user account. In operation 1112, the server 300 may transmit the language model type information (first type), the language model data, and the sentence input information to the second electronic device 200.

For example, in the case where the second electronic device 200 uses a second-type language model different from the first type, the second electronic device 200 may check the language model type information in operation 1114 and may determine that it has received language model data of an incompatible type. In this case, in operation 1116, the second electronic device 200 may update second-type language model data based on the received sentence input information, instead of merging the language model data. In this manner, in an embodiment of the present disclosure, compatible partial information is synchronized between electronic devices using different language models so that a user experience may be improved. For example, provided that the wording "I am reading a book" is input, the language models may not be compatible with each other in terms of a probability that "reading" will follow "am", but may be compatible with each other in terms of a history of input of "reading" following "am", so that substantially the same predicted word may be provided.

In the embodiment of FIG. 11, the server 300 provides entire information to the second electronic device 200, and the second electronic device 200 determines data to be synchronized, but, in various embodiments of the present disclosure, the language model type information of each electronic device may be stored in the server 300. In this case, the server 300 may transmit the sentence input information alone without transmitting language model data if the language model type of received language model data is different from the language model type of an electronic device to be synchronized, so that the amount of use of data may be reduced.

Figure 12:
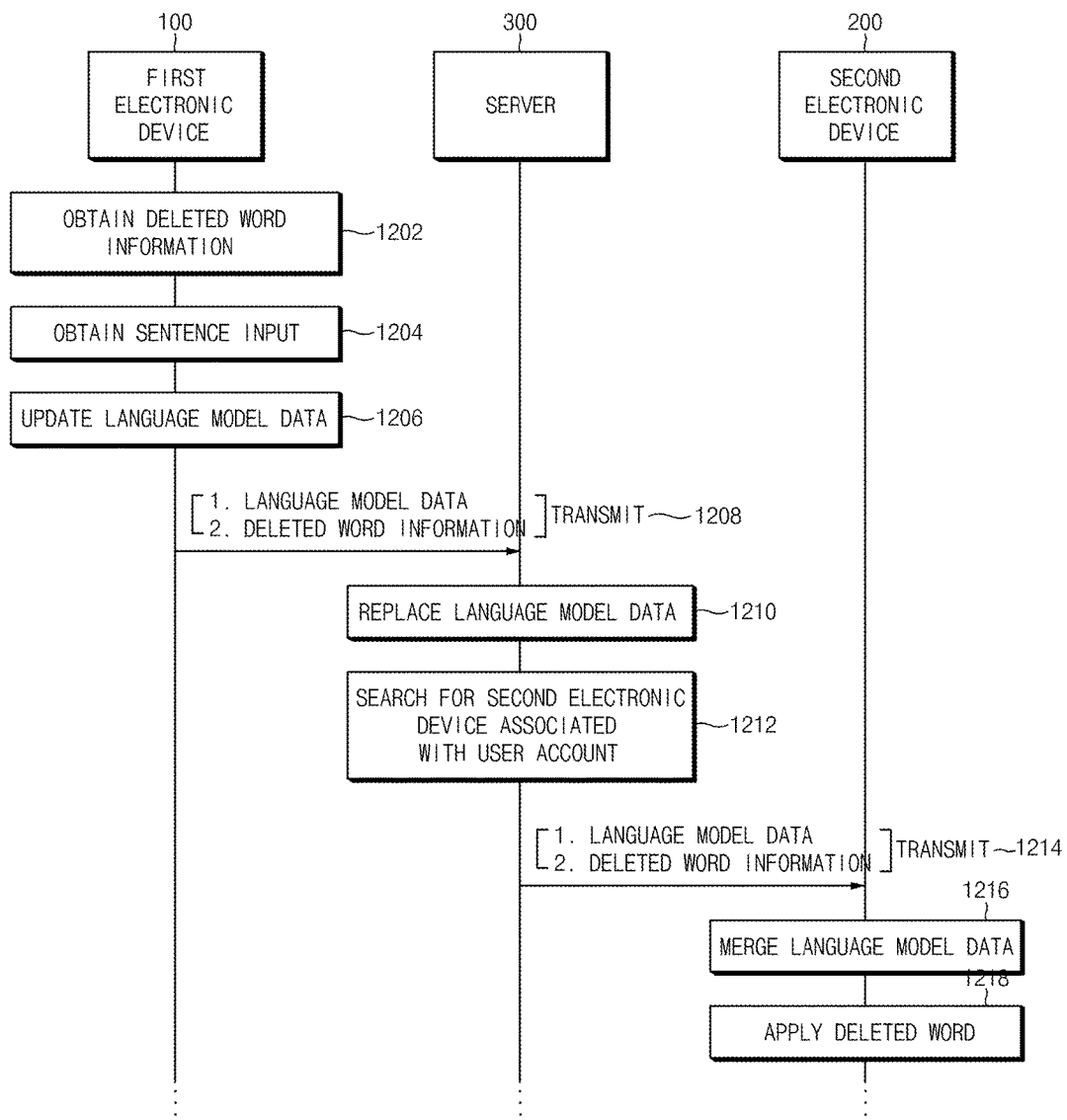
FIG. 12 illustrates a synchronization process for considering a deleted predicted word according to an embodiment of the present disclosure.

FIG. 12 illustrates a synchronization process for considering a deleted predicted word according to an embodiment of the present disclosure.

In the case where a predicted word provided based on the language model of the first electronic device 100 is deleted or excluded by the user, the word deleted from corresponding language model data may be restored if the language model is merged with that of the second electronic device 200. For example, in the case where a word A is deleted from language model data including the word A and words B, C, D, and E, the deleted word A may be restored if the language model data is merged with other language model data including the words A, B, C, D, and E. Described below is a process in which, when synchronization is performed in consideration of a history of deletion by the user, the history of deletion may also be considered for language model data of another electronic device.

Referring to FIG. 12, in operation 1202 the first electronic device 100 obtains information on a deleted word. For example, when a sentence is input to the first electronic device 100, predicted words that are expected to be input may be displayed based on language model data, and any of the displayed predicted words may be deleted by the user. In operation 1202, the processor 210 may generate a deleted word database for such deleted words.

The first electronic device 100 may obtain a sentence input in operation 1204, and may update language model data in consideration of the deleted predicted words in operation 1206.

In operation 1208, the first electronic device 100 may transmit, to the server 300, the language model data and deleted word information such as the deleted word database. In operation 1210, the server 300 may replace language model data previously stored therein with the language model data obtained in operation 1208, and, in operation 1212, the server 300 may search for the second electronic device 200 associated with a user account.

In operation 1214, the server 300 may transmit, to the second electronic device 200, the substituted language model data together with the deleted word information.

In operation 1216, the second electronic device 200 may merge language model data previously stored therein with the received language model data. In this operation, the predicted words deleted by the first electronic device 100 may possibly be restored. On completion of the merging, the second electronic device 200 may merge the deleted word information with the merged language model data in operation 1218. Through operation 1218, synchronization may be achieved such that predicted words are equally deleted, even if deleted predicted words are restored in operation 1216.

A process for initializing language model data in all user terminals may proceed in a similar flow to that of the process of FIG. 12. For example, in the case where language model data is initialized in the first electronic device 100, the language model data may be resultantly synchronized with the language model data of the second electronic device 200. Therefore, the process may be so configured that up synchronization is performed on completion of initialization of the language model data in the first electronic device 100. In this case, the first electronic device 100 may also transmit initialization information to the server 300 at the time of the up synchronization. The server 300 may replace language model data previously stored therein with received language model data (i.e., initial language model data), and may transmit the language model data and the initialization information to the second electronic device 200. The second electronic device 200 may initialize all the trained data by applying the initialization information after merging the language model data. In an embodiment of the present disclosure, in the case of the presence of the initialization information, the second electronic device 200 may skip a language model data merging process and may preferentially perform an initialization operation.

Figure 13A:
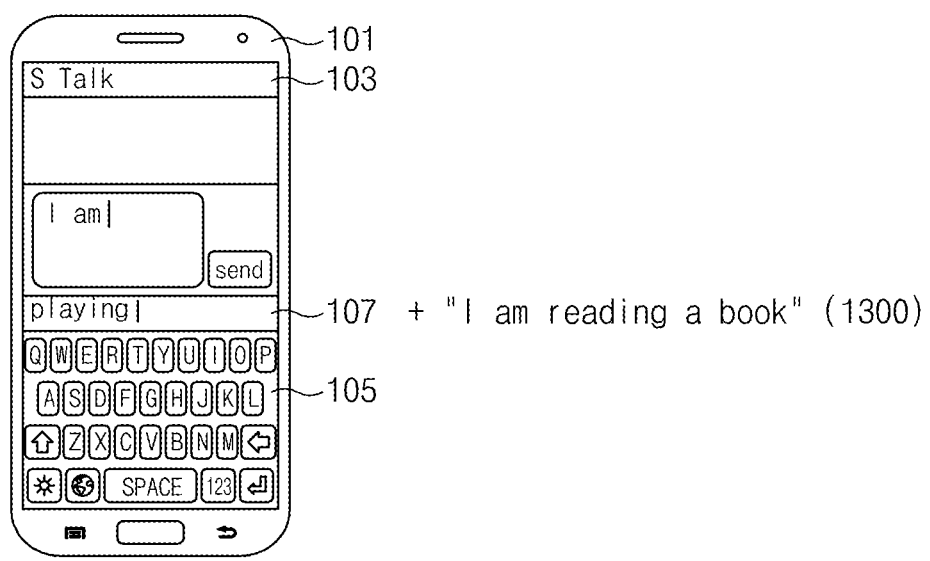
FIGS. 13A to 13C illustrate screens according to language model synchronization according to various embodiments of the present disclosure.
Figure 13B:
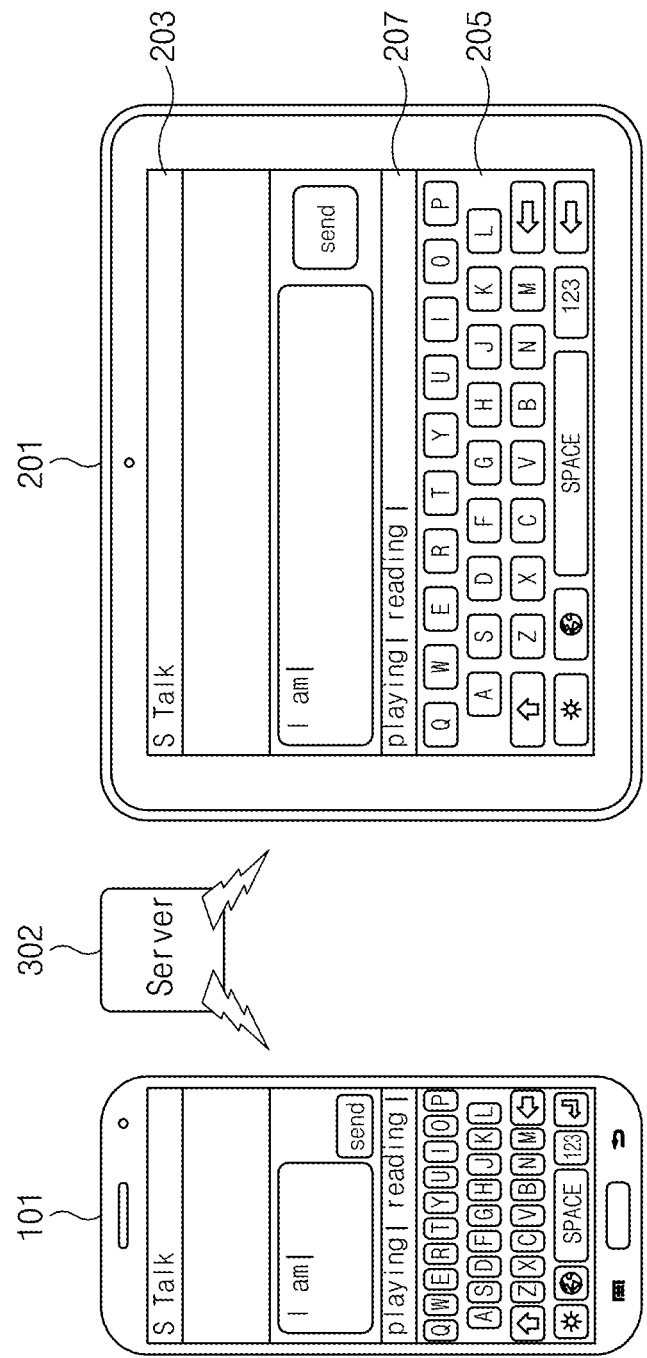
Figure 13C:
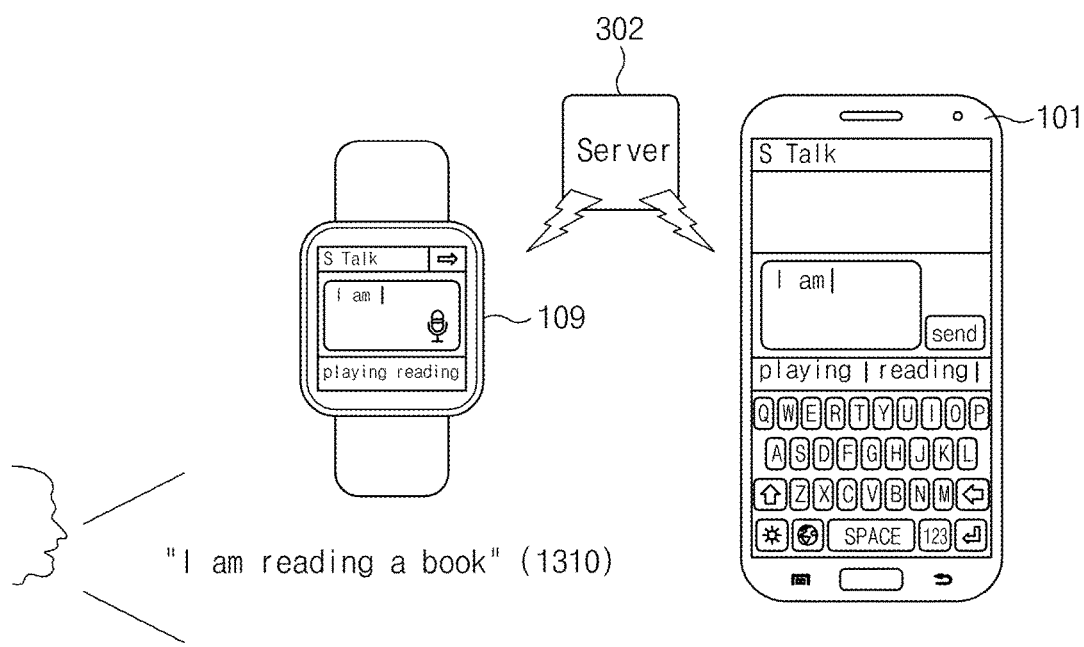

FIGS. 13A to 13C illustrate screens according to language model synchronization according to various embodiments of the present disclosure.

Referring to FIG. 13A, an example is provided in which a predicted word is provided when a sentence input 1300 is generated through an SIP 105 while an instant messaging application 103 is running in a user terminal 101. For example, when a user inputs "I am" with an intention of inputting "I am reading a book", the user terminal 101 may predict "playing" based on a language model, and may output the predicted word to a predicted word region 107. If the sentence "I am reading a book" is finally input by the user, the user terminal 101 may generate relational information indicating that "am" is followed by "reading", by updating the language model.

Referring to FIG. 13B, if the language model of the user terminal 101 is synchronized with that of another user terminal 201 through a server 302, both the terminals may provide "playing" and "reading" as predicted words when "I am" is input by the user Similar to that illustrated in FIG. 13A, the other user terminal 201 includes an instant messaging application 203, an SIP 205, and a predicted word region 207.

In this state, if the wording "I am working now" is input to the user terminal 201, the language model thereof is updated and synchronized, and then "I am" is input to the user terminal 101, the user terminal 101 may recommend "reading", "playing", and "working" or at least one of the foregoing words based on probabilities thereof.

Referring to FIG. 13C, an example is provided in which language model data of a wearable device 109 is synchronized with that of the user terminal 101 based on a voice input obtained by the wearable device 109. The wearable device 109 may be, for example, a smart watch, a smart band, or a necklace-type device (e.g., Gear Circle). In general, the wearable device 109 has a compact size compared to other electronic devices such as smartphones or tablets, and thus may be provided with a small display screen or may not be equipped with a display. In other words, the wearable device 109 may have a structure unsuitable for installing a hardware or software module-type keyboard. In the wearable device 109, a sentence may be input through user's selection of predicted words output to a small display or through voice recognition on a voice input.

According to an embodiment of the present disclosure, an input mainly obtained by the wearable device 109 may be a user's voice input provided through a microphone of the wearable device 109. The voice input may be converted into a sentence input by a voice recognition module or function installed in the wearable device 109 itself, or another electronic device paired with the wearable device 109, or a voice recognition server directly or indirectly connected to the wearable device 109. Here, the sentence input may include at least one word. Since voice recognition has been described in detail with reference to FIG. 2, detailed descriptions are not provided for FIG. 13C.

According to an embodiment of the present disclosure, if a speech 1310 stating "I am reading a book" is input through the microphone of the wearable device 109 by the user, the wearable device 109 (e.g., an input processing unit) may analyze the speech for itself or through another device and may generate input word information based on a result of analysis. The input word information generated in this manner may enable generation and synchronization of relational information in association with another electronic device (e.g., the user terminal 101) according to a language model synchronization method as described above with respect to various examples. For example, the wearable device 109 may update language model data of the wearable device 109 based on the speech 1310, and may transmit the updated language model data to the server 302. The server 302 may replace language model data previously stored therein with the received language model data, and may transmit it to the user terminal 101. As a result, in the user terminal 101, existing language model data may be merged with the language model data transferred from the wearable device 109. For example, in a current state in which "playing" is recommended as a predicted word when "I am" is input through the SIP of the user terminal 101, if the speech 1310 stating "I am reading a book" is input to the wearable device 109 and language model data synchronization is achieved by applying the speech input, "reading" may be provided as a predicted word in addition to "playing" when "I am" is input the user terminal 100.

Although voice data is received by a wearable device and is synchronized with data of the terminal 100 in the above-mentioned example, a voice input may also be received by a terminal and may be used as an input means equivalent to a text input received through the SIP.

Figure 14:
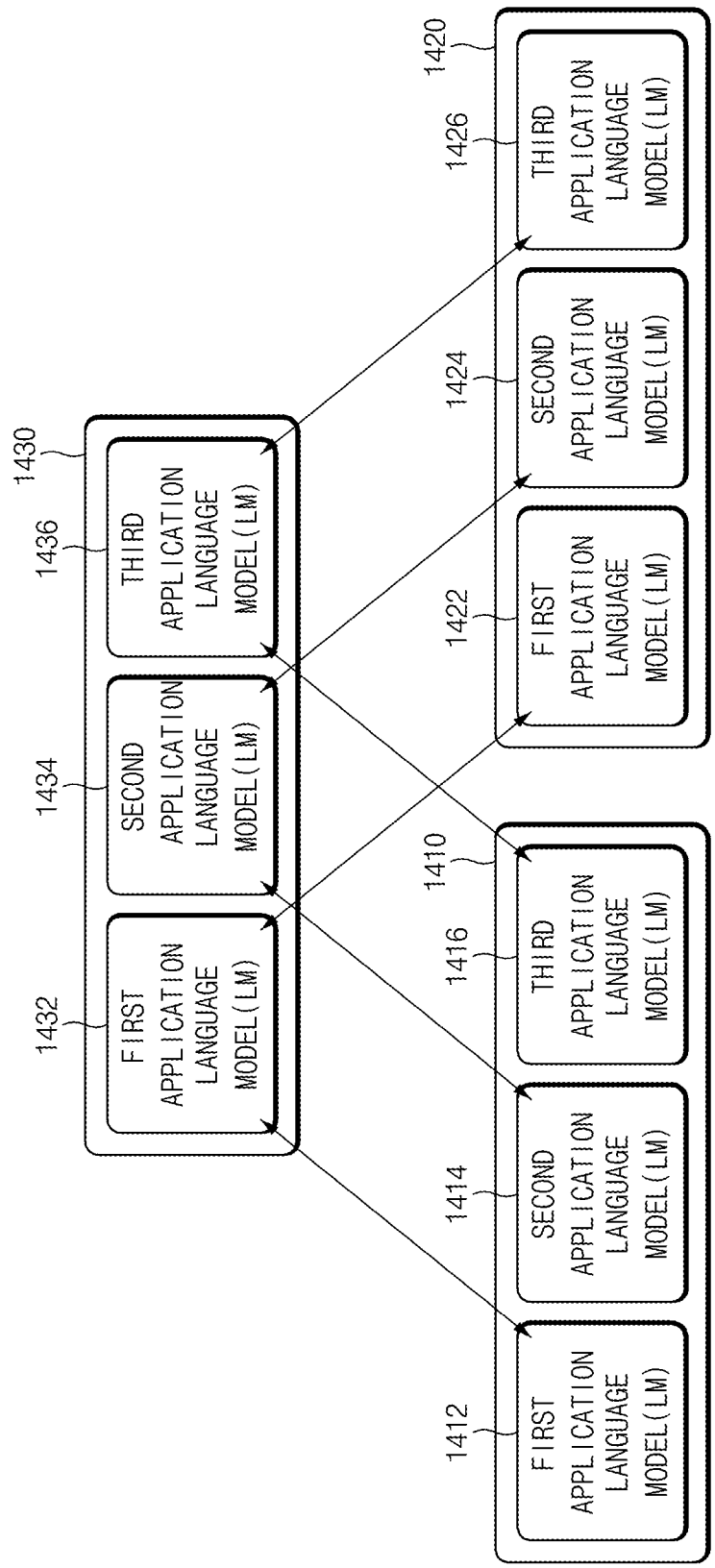
FIG. 14 conceptually illustrates a method of synchronizing language models according to an application according to an embodiment of the present disclosure.

FIG. 14 conceptually illustrates a method of synchronizing language models according to an application according to an embodiment of the present disclosure.

According to an embodiment of the present disclosure, a language model may be managed differently according to an application. For example, the same language model may be trained by different sentence inputs according to an application, or different language models may be used according to an application. For example, a user of an electronic device may exhibit different tendencies with respect to sentence input when using a message application such as a short message service (SMS), when using a social network service application such as Facebook or Twitter, and when writing an email. For example, predicted words that are based on sentence inputs to a social network service application mainly used between friends may not be helpful to write an official email.

Referring to FIG. 14, a first user terminal 1410 according to an embodiment of the present disclosure may include a first application language model 1412, a second application language model 1414, and a third application language model 1416. The language models may be trained and updated based on sentence inputs provided through respective applications. A server 1430 and a second user terminal 1420 may also perform synchronization among language models corresponding to respective applications. For example, the first application language model 1412 may replace a first application language model 1432 of the server 1430 and then may be merged with a first application language model 1422 of the second user terminal 1420. Likewise, the second application language model 1414 may replace a second application language model 1434 of the server 1430 and then may be merged with a second application language model 1424 of the second user terminal 1420, and the third application language model 1416 may replace a third application language model 1436 of the server 1430 and then may be merged with a third application language model 1426 of the second user terminal 1420.

The method of synchronizing language model data according to an application illustrated in FIG. 14 may be applied correspondingly to a method of synchronizing language model data according to an input field. For example, an input screen of a message application such as SMS may include a message recipient field and a message contents field. In general, in a state in which the other side of a conversion has already been selected, the input screen of the message application which receives conversation contents may include the message contents field alone. An input screen of an email application may include a recipient field, an email title field, and an email contents field. An input screen of an Internet application may include a website address input field and a search word input field. In this situation, according to a language model data synchronizing method according to an embodiment of the present disclosure, a language model may be differently applied according to an input field. The electronic device 100 may collect inputs to recipient fields of various applications, may update and synchronize language model data based on the collected inputs, and may recommend a frequently used word (e.g., recipient) as a predicted word when a recipient field is selected in a specific application.

Figure 15:
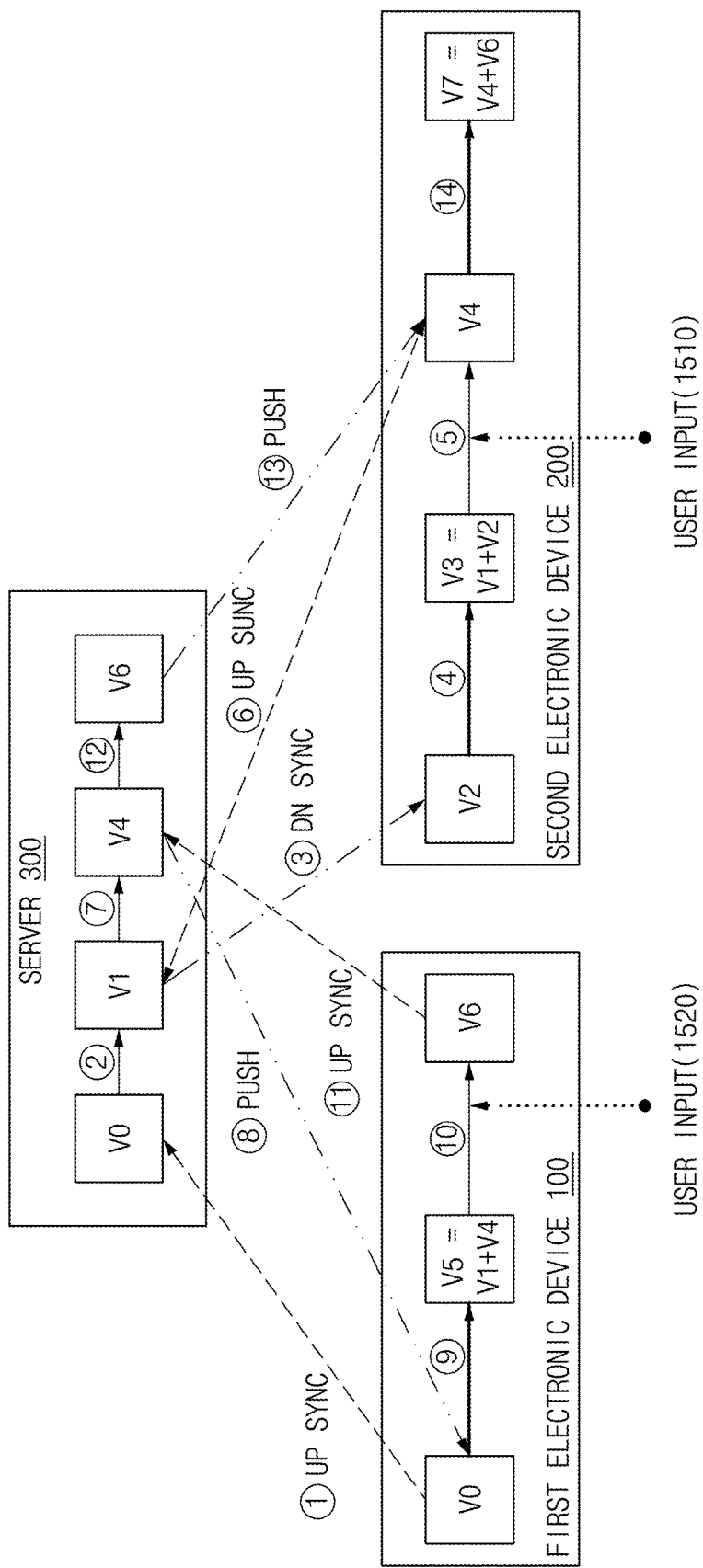
FIG. 15 illustrates a synchronization sequence in a synchronization system according to an embodiment of the present disclosure.

FIG. 15 illustrates a synchronization sequence in a synchronization system according to an embodiment of the present disclosure.

Referring to FIG. 15, the first electronic device 100 may include a language model (or language model data) of a first version (V1), and a second electronic device 200 may include a language model of a second version (V2). In an embodiment of the present disclosure, it may be assumed that the language model of the server 300 is in an initialized state (V0). In another embodiment of the present disclosure, the language model of the server 300 may have any other version, but it is assumed for convenience that the language model of the server 300 is in the initialized state since the language model of an initial version of the server 300 is replaced with the language model of the first version.

Furthermore, in the example illustrated in FIG. 15, the up synchronization (UP SYNC) may be represented by a dashed line, the down synchronization (DOWN SYNC) and a synchronization notification message (PUSH) may be represented by a 2-point chain line, language model replacement and updating by a user input may be represented by a solid line, and language model merging may be represented by a bolded solid line.

The first electronic device 100 may upload the language model of the first version to the server 300 in operation 1. Upon receiving the language model of the first version from the first electronic device 100, the server 300 may replace the language model of the initial version V0 installed therein with the language model of the first version in operation 2. The server 300 may transmit the language model of the first version to the second electronic device 200 in operation 3.

Upon receiving the language model of the first version from the server 300, the second electronic device 200 may generate a language model of a third version by merging the language model of the first version with the language model of the second version in operation 4. Thereafter, the second electronic device 200 may update the language model of the third version into a language model of a fourth version based on a received user input 1510 in operation 5.

In an embodiment of the present disclosure, the second electronic device 200 may transmit the language model of the third version to the server 300, and the server 300 may replace the language model of the first version with the language model of the third version and may transmit the language model of the third version to the first electronic device 100. In this case, since the language model of the third version is generated even if the language model of the first version is merged with the language model of the third version, the language models may be synchronized as the third version among the first electronic device 100, the second electronic device 200, and the server 300 in the synchronization system. However, as described above with respect to various embodiments of the present disclosure, a synchronization operation may be performed at a time interval or may be performed when a specific condition is satisfied. Relevant description is further provided below.

Referring to FIG. 15, the second electronic device 200 may transmit the language model of the fourth version to the server 300 in operation 6. The server 300 may replace the language model of the first version with the language model of the fourth version in operation 7, and may transmit a synchronization notification message on the language model of the fourth version to the first electronic device 100 or may transmit the language model of the fourth version to the first electronic device 100 in operation 8. Upon receiving the language model of the fourth version, the first electronic device 100 may generate a language model of a fifth version by merging the received language model with the language model of the first version operation 9. In a similar manner to that of operation 5, the first electronic device 100 may update the language model into a language model of a sixth version based on a user input 1520 to the first electronic device 100 in operation 10.

The first electronic device 100 may transmit the language model of the sixth version to the server 300 in operation 11, and the server 300 may replace the language model of the fourth version with the language model of the sixth version in operation 12. The server 300 may transmit the language model of the sixth version or a synchronization notification message on the language model of the sixth version to the second electronic device 200 in operation 13, and, upon receiving the language model of the sixth version, the second electronic device 200 may generate a language model of a seventh version by merging the received language model with the language model of the fourth version in operation 14.

The above-mentioned synchronization sequence is merely an example, and the various modifications described above with reference to FIGS. 6 to 12 may be applied thereto.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 210), the processor may perform functions corresponding to the instructions. The computer-readable storage medium may be, for example, the memory 220.

For example, in an electronic device including a communication module, an input interface, a processor electrically connected to the communication module and the input interface, and a memory electrically connected to the processor and including language model data, the memory may store instructions that, when executed, cause the processor to receive a touch or voice input through the input interface, generate a text based on the input, apply at least one word to the language model data based on the generated text, receive first version information related to the language model data from a server via the communication module, and compare the first version information with second version information stored in the memory before reception of the first version information. Here, the first version information or the second version information may include time stamp information of the language model data and information on a device related to update.

Furthermore, the memory may store instructions that, when executed, cause the processor to receive language model data of the server via the communication module, merge the received language model data with the language model data included in the memory, and transmit the merged language model data to the server via the communication module if the first version information is different from the second version information as a result of the comparison or cause the processor to transmit the language model data included in the memory to the server via the communication module if the first version information is the same as the second version information. In various embodiments of the present disclosure, transmission or reception of the language model data may be performed based on a user account corresponding to the electronic device, and the language model data may include relational information between the at least one word and another word different from the at least one word.

A computer-readable recording medium may include a hard disk, a floppy disk, a magnetic medium (e.g., a magnetic tape), an optical medium (e.g., compact disc read-only memory (CD-ROM), digital versatile disc (DVD)), a magneto-optical medium (e.g., a floptical disk), or a hardware device (e.g., a ROM, a random access memory (RAM), a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

The module or program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

According to various embodiments of the present disclosure, text data may be synchronized among a plurality of electronic devices so that an input word prediction function may be improved and consistent user experience may be maintained.

Furthermore, loss of an input history which may occur at the time of language model synchronization may be prevented, or words intentionally excluded by a user from predicted words may be prevented from being provided again as predicted words after the synchronization.

Moreover, electronic devices that use different language models may provide an input history to one another so that the language models may be improved.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
    a memory configured to store a first language model for providing an input word prediction function;
    a communication module configured to communicate with a server;
    an input interface configured to obtain a sentence input; and
    a processor configured to:
        update the first language model based on the sentence input, and
        synchronize an updated portion of the first language model with a second language model of another electronic device by causing the communication module to transmit information on the sentence input to the server, wherein a type of the second language model is different from a type of the first language model,
    wherein the transmitted information includes type information of the first language model,
    wherein the information on the sentence input is provided to the other electronic device, and
    wherein the information on the sentence input is used by the other electronic device to update the second language model.

2. The electronic device of claim 1, wherein the transmitted information does not include language model data of the first language model.